(12) United States Patent
Lin

(10) Patent No.: US 12,557,294 B1
(45) Date of Patent: Feb. 17, 2026

(54) MAGNETORESISTIVE RANDOM ACCESS MEMORY

(71) Applicant: Chun-Ming Lin, Hsinchu County (TW)

(72) Inventor: Chun-Ming Lin, Hsinchu County (TW)

(*) Notice: Subject to any disclaimer, the term of this patent is extended or adjusted under 35 U.S.C. 154(b) by 0 days.

(21) Appl. No.: 19/275,168

(22) Filed: Jul. 21, 2025

Related U.S. Application Data

(60) Provisional application No. 63/683,980, filed on Aug. 16, 2024.

(51) Int. Cl.
*H10B 61/00* (2023.01)
*H10N 50/10* (2023.01)

(52) U.S. Cl.
CPC ........... *H10B 61/10* (2023.02); *H10N 50/10* (2023.02)

(58) Field of Classification Search
CPC .............................. H10B 61/10; H10N 50/10
USPC ........................................................ 257/421
See application file for complete search history.

(56) References Cited

U.S. PATENT DOCUMENTS

| | | | | |
|---|---|---|---|---|
| 9,647,202 B2* | 5/2017 | Gan | ...................... | H01F 41/302 |
| 11,476,409 B2* | 10/2022 | Le | ........................... | H10N 50/10 |
| 11,569,438 B2* | 1/2023 | Reznicek | ............... | H10N 50/85 |
| 2014/0183608 A1* | 7/2014 | Gan | ...................... | H01F 10/329 |
| | | | | 257/292 |
| 2015/0021675 A1* | 1/2015 | Min | ...................... | H10N 50/10 |
| | | | | 257/295 |
| 2019/0006582 A1* | 1/2019 | Pinarbasi | ............... | H10N 50/10 |
| 2019/0066747 A1* | 2/2019 | Lee | ......................... | G11C 11/161 |
| 2019/0206941 A1* | 7/2019 | Kim | ....................... | H10B 61/22 |
| 2019/0207095 A1* | 7/2019 | Kardasz | .............. | H01F 10/3286 |
| 2019/0272863 A1* | 9/2019 | Jung | ...................... | H10N 50/85 |
| 2020/0303631 A1* | 9/2020 | Gajek | .................... | H10N 50/10 |
| 2021/0193910 A1* | 6/2021 | Jabeur | .................... | H10N 50/85 |
| 2021/0288247 A1* | 9/2021 | Nowak | .................. | H10N 50/01 |
| 2023/0186963 A1* | 6/2023 | Kim | ...................... | G11C 11/1653 |
| | | | | 365/158 |
| 2023/0413681 A1* | 12/2023 | Filippou | ............... | G11C 11/161 |
| 2024/0365678 A1* | 10/2024 | Kim | ........................ | H10N 50/01 |

OTHER PUBLICATIONS

"Belong." Merriam-Webster.com Dictionary, Merriam-Webster, https://www.merriam-webster.com/dictionary/belong. Accessed Aug. 19, 2025.) (Year: 2025).*

* cited by examiner

*Primary Examiner* — Jami Valentine Miller
(74) *Attorney, Agent, or Firm* — WPAT, P.C.; Anthony King

(57) ABSTRACT

The present disclosure provides a magnetoresistive random access memory (MRAM), including a magnetic tunnel junction (MTJ) and a transistor structure. The magnetic tunnel junction includes a magnetic fixed layer, a tunnel barrier layer, a magnetic free layer and at least one magnetic enhancement layer. The tunnel barrier layer is stacked with the magnetic fixed layer. The magnetic free layer is stacked with the tunnel barrier layer. The at least one magnetic enhancement layer is disposed corresponding to at least one of the magnetic free layers or the magnetic fixed layers. The transistor structure is electrically connected to the magnetic tunnel junction.

20 Claims, 20 Drawing Sheets

MAGNETORESISTIVE RANDOM ACCESS MEMORY

PRIORITY CLAIM AND CROSS-REFERENCE

This application claims the benefit of U.S. provisional application No. 63/683,980 filed Aug. 16, 2024. The entirety of the above-mentioned patent application is hereby incorporated by reference herein and made a part of this specification.

BACKGROUND OF THE PRESENT DISCLOSURE

Field of the Present Disclosure

The present disclosure relates to a magnetoresistive random access memory (MRAM), and more particularly to an MRAM of which a magnetic tunnel junction includes a magnetic enhancement layer or a horizontal stacked structure.

Description of the Prior Art

Magnetoresistive random access memories (MRAMs), featuring advantages of high read and write speeds, outstanding durability, non-volatility and low power consumption, continue to draw more and more attention. However, to produce high-performance magnetic films, improving the magnetic field strength and magnetic field directionality in the magnetic free layer and the magnetic fixed layer of the magnetic tunnel junction is a goal that needs to be achieved. Moreover, since magnetic memory cells are easily affected by external signals and magnetic fields, data storage may be easily interfered.

SUMMARY OF THE PRESENT DISCLOSURE

To address the technical issues above, the present disclosure provides a magnetoresistive random access memory (MRAM) including a magnetic tunnel junction (MTJ) and a transistor structure. The magnetic tunnel junction includes a magnetic fixed layer, a tunnel barrier layer, a magnetic free layer and at least one magnetic enhancement layer. The tunnel barrier layer is stacked with the magnetic fixed layer. The magnetic free layer is stacked with the tunnel barrier layer. The at least one magnetic enhancement layer is disposed corresponding to at least either the magnetic free layer or the magnetic fixed layer. The transistor structure is electrically connected to the magnetic tunnel junction in series.

The present disclosure further provides an MRAM including a magnetic tunnel junction (MTJ) and a transistor structure. The magnetic tunnel junction includes a magnetic fixed layer, a tunnel barrier layer and a magnetic free layer. The tunnel barrier layer is arranged side-by-side with the magnetic fixed layer. The magnetic free layer is stacked with the tunnel barrier layer. The transistor structure is electrically connected to the magnetic tunnel junction in series. Respective bottom surfaces of the magnetic free layer, the tunnel barrier layer and the magnetic fixed layer form a coplanar surface.

BRIEF DESCRIPTION OF THE DRAWINGS

Various aspects of the present disclosure can be best understood after going through the embodiments and the accompanying drawings below. It should be noted that, according to standard process practice in the field, the various features in the drawings are not drawn to scale. In fact, for clear illustrations, dimensions of some features may be intentionally enlarged or reduced.

DETAILED DESCRIPTION OF THE EMBODIMENTS

Figure 1:
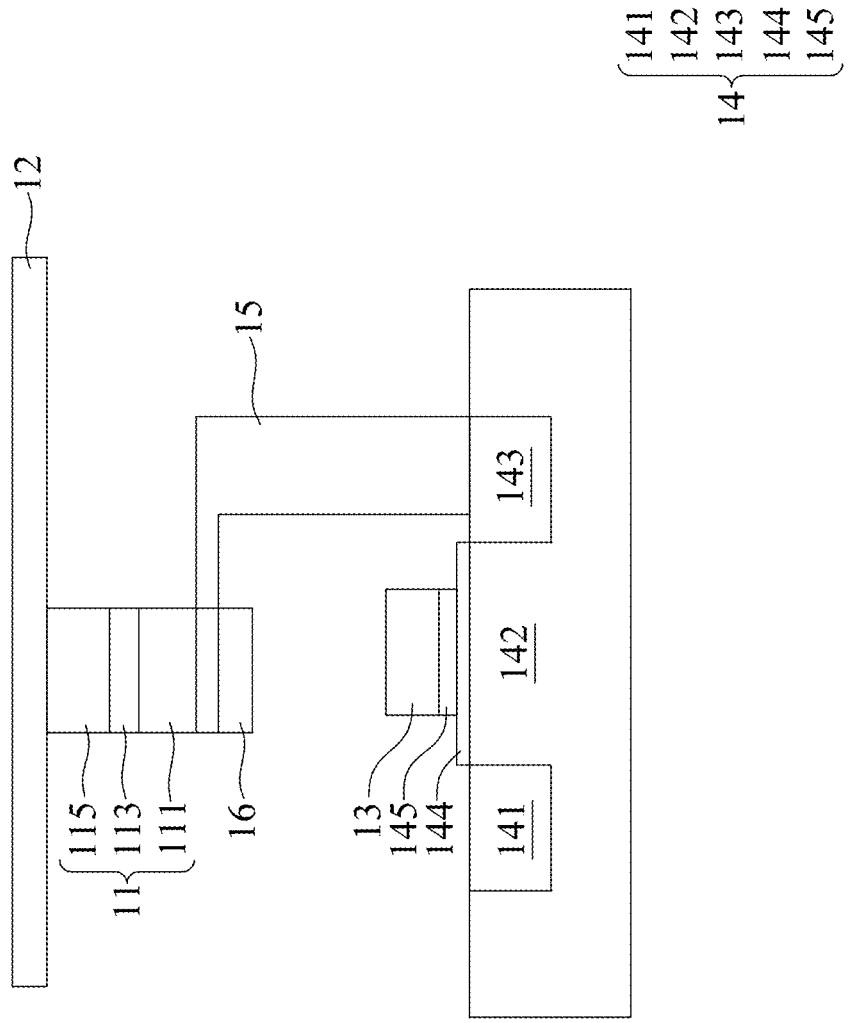
FIG. 1 is a schematic diagram of a magnetic random-access memory (MRAM) according to an embodiment of the present disclosure.

In the description below, various embodiments or examples are disclosed to enable implementation of different features of the present disclosure. Specific examples of elements and configurations are recited in the description below to simplify the present disclosure. It is conceivable that such description provides only examples and is not intended for limiting the present disclosure. For example, in the detailed description below, a first feature formed above a second feature or on/over a second feature may also include an embodiment in which the first feature and the second feature are formed in a direct contact manner, and may include an embodiment in which an additional feature is formed between the first feature and the second feature in a way that the first feature and the second feature are not in direct contact with each other. Moreover, numerals and/or symbols may be repeatedly used for elements in the various embodiments of the present disclosure. Such repetition is intended for conciseness and clarity, and does not determine or represent relations between different embodiments or configurations discussed herein.

Moreover, terms of relative spatial relations (for example, "beneath", "below", "lower", "above" and "upper" and the like) may be used to describe a relation of one element or feature relative to another (other) element(s) or feature(s). In addition to the orientation depicted in the drawings, the relative spatial terms are also intended to cover different orientations of a device in use or in operation. The apparatus may be configured in other orientations (for example, rotated by 90 degrees or oriented otherwise), and the relative spatial terms may be interpreted correspondingly and similarly.

Although numerical ranges and parameters in broader ranges defined in the present disclosure are all approximate values, related values in the specific embodiments are presented as precisely as possible herein. However, any value intrinsically and inevitably contains a standard deviation because of individual testing methods. Herein, the term "substantially", "about" or "approximately" usually refers to being within numerical values or ranges understandable to a person of ordinary skill in the art. Alternatively, the term "substantially", "about" or "approximately" may represent that an actual value is within standard errors understandable to a person of ordinary skill in the art.

The magnetic memory described in the present disclosure refers to a magnetoresistive random access memory (MRAM). In an MRAM, each memory cell includes a magnetic tunnel junction (MTJ), which includes a magnetic free layer, a magnetic fixed layer (or a magnetic reference layer) and a tunnel barrier layer. A data storage mechanism of the MRAM is, according to magnetization polarization states of the magnetic free layer and the magnetic reference layer of the magnetic tunnel junction, determining data stored in the memory cell. Because the tunnel barrier layer is a thin insulator structure, an occurrence of tunnel magnetoresistance (TMR) exists among the magnetic free layer, the tunnel barrier layer and the magnetic fixed layer (or the magnetic reference layer). This phenomenon allows electrons to tunnel from one ferromagnet to another ferromagnet when the insulating layer between them is sufficiently thin, and the probability of the tunneling is associated with the magnetization polarization states of the magnetic free layer and the magnetic fixed layer. Specifically, when directions of the magnetization polarization in the magnetic free layer and the magnetic reference layer are substantially the same (or referred to as being parallel), the magnetic tunnel junction may have a lower resistance; when directions of the magnetization polarization in the magnetic free layer and the magnetic reference layer are substantially opposite (or referred to as being anti-parallel), the magnetic tunnel junction may have higher resistance. Thus, the data stored in a memory cell can be determined to be "0" or "1" by detecting the resistance state of the magnetic tunnel junction.

Currently, advanced MRAMs include spin transfer torque MRAMs (STT-MRAMs) and spin-orbit torque MRAM (SOT-MRAM), and the two have different mechanisms of switching magnetization polarization. In general, an STT-MRAM uses a spin-polarized current to switch the magnetization polarization state of the magnetic free layer, and transfers spin angular momentum and inverts the direction of magnetization polarization of the magnetic free layer by passing a current directly through the magnetic tunnel junction. An SOT-MRAM achieves faster switching by using spin-orbit interaction, and generates a spin current by applying a current to an adjacent heavy metal layer (that does not pass through the magnetic tunnel junction) to switch the direction of magnetization polarization of the magnetic free layer. To write "0" and "1", STT-MRAM needs to let electrons flowing through the magnetic free layer, whereas SOT-MRAM only needs to let electrons entering the magnetic free layer. Compared with an STT-MRAM, an SOT-MRAM only needs to provide more conductive electrons having the same spin state and injects these conductive electrons into a ferromagnetic layer. As a result, a stronger magnetic torque is produced, such that the direction of polarization of the magnetic free layer can be more easily inverted, thereby achieving a higher processing speed and lower power consumption.

The MRAM structure provided by the present disclosure, in addition to being applicable to the STT-MRAM or SOT-MRAM discussed above, is also applicable to other MRAMs to further improve performance of various types of MRAMs. Although the inversion of the polarization direction is feasible, there may exist the following drawbacks: (a) a critical current density for inversion of the polarization direction can be up to $10^7$ A/cm$^2$. This issue poses a great challenge on the driving current specification of semiconductor wiring structures. (b) for an STT-MRAM, since a current needs to pass through the insulating tunnel layer of the magnetic tunnel junction for both read and write operations, the increasing tunneling events also increase the probability of puncturing the magnetic tunnel junction. This issue leads to aging and thus failure of a device, and a high-resistance state and a low-resistance state may no longer be differentiated. (c) during operation of these two types of MRAMs, two ferromagnetic layers inside the magnetic tunnel junction are simultaneously acted upon by a transfer torque provided by the current, which makes a difference between coercive forces of the upper and lower ferromagnetic layers is extremely small. During a write process, inverting both the magnetic free layer and the magnetic fixed layer may occur simultaneously, leading to an error of the device. Such probability is referred to as a write error rate (WER). In order to keep WER≤$10^{-9}$ (that is, only one error occurs in every billion times of write operations), the write operation needs to have a shortest time interval. However, the average speed at which a modern computer performs floating point operations is over $10^{11}$ per second (10 giga floating point operations per second, that is, 10 GFLOPS). It is then inevitable that the write speed of an STT-MRAM may be severely reduced to meet WER requirements.

FIG. 1 shows a schematic diagram of an MRAM according to an embodiment of the present disclosure. As shown in FIG. 1, an MRAM 10 includes a magnetic tunnel junction (MTJ) 11, a bit line 12, a read word line 13 and a transistor structure 14. The magnetic tunnel junction 11 includes a magnetic fixed layer 111, a tunnel barrier layer 113, a magnetic free layer 115 and at least one magnetic enhancement layer 1111, 1112, 1151 and 1152 (not shown in FIG. 1, refer to FIG. 2 to FIG. 4). The at least one magnetic enhancement layer is disposed corresponding to at least one of the magnetic free layer 115 or the magnetic fixed layer 111. The bit line 12 is connected to one of the magnetic free layer 115 or the magnetic fixed layer 111. The transistor structure 14 is electrically connected to the magnetic tunnel junction 11 in series. The read word line 13 may be electrically connected to a gate region 145 of the transistor structure 14, and is configured to control an on/off state of the transistor structure 14. In this embodiment, the magnetic fixed layer 111, the tunnel barrier layer 113 and the magnetic free layer 115 are stacked along a vertical direction (the Z direction); however, in other embodiments, the stacking sequence of these layers may be in reverse. That is, in this embodiment, the bit line 12 is connected to the magnetic free layer 115, and the conductive structure 15 for writing and reading data is connected to the magnetic fixed layer 111; in other embodiments, the bit line 12 may be connected to the magnetic fixed layer 111, and the conductive structure 15 may be connected to the magnetic free layer 115.

The magnetic fixed layer 111 and the magnetic free layer 115 may include a ferromagnetic material, such as iron (Fe), cobalt (Co), nickel (Ni), cobalt iron boron (CoFeB), and an alloy and a multilayer stacked structure of the materials above. The tunnel barrier layer 113 may include magnesium oxide (MgO). MgO has good tunnel magnetoresistance (TMR) characteristics. When directions of magnetization polarization on both sides of the tunnel barrier layer 113 are the same (parallel), the tunnel barrier layer 113 may have a first resistance; when the directions of magnetization polarization on both sides of the tunnel barrier layer 113 are opposite (anti-parallel), the tunnel barrier layer 113 may have a second resistance. When MgO or other materials are used as the material of the tunnel barrier layer 113, a difference between the first resistance and the second resistance above may be effectively increased to yield a higher signal contrast.

The bit line 12 may include copper (Cu) or other conductor materials, and may be connected to an upper electrode E1 (not shown in FIG. 1, refer to FIG. 2 to FIG. 4) of the magnetic tunnel junction 11, and the conductive structure 15 may include Cu or other conductor materials and may be connected to a lower electrode E2 (refer to FIG. 2 to FIG. 4) of the magnetic tunnel junction 11. As shown in FIG. 1, the bit line 12 may extend along a first direction (the X direction). The bit line 12 may be connected to a magnetic tunnel junction of other MRAM cells. While a memory cell is being written or read, the bit line 12 may be applied with different current signals. More specifically, when a write operation is performed, the bit line 12 is applied with a spin-polarized current, so that the magnetic state of the magnetic tunnel junction 11 or the direction of magnetization polarization of the magnetic free layer 115 can be changed. When a read operation is performed, the bit line 12 is applied with a small sensing current to measure the resistance state of the magnetic tunnel junction 11, so that data stored in the magnetic tunnel junction 11 of the memory cell can be determined to be "0" or "1".

In some embodiments, the MRAM 10 is based on the memory architecture of an SOT-MRAM. However, in other embodiments, the MRAM 10 may also be based on the memory architecture of an STT-MRAM or other types of memories. As shown in FIG. 1, the MRAM 10 may selectively include a write line 16, which may be used to write data to the magnetic tunnel junction 11.

In some embodiments, the transistor structure 14 may include a source region 141, a channel region 142, a drain region 143, a gate region 145 and a gate insulating layer 144.

Figure 2:
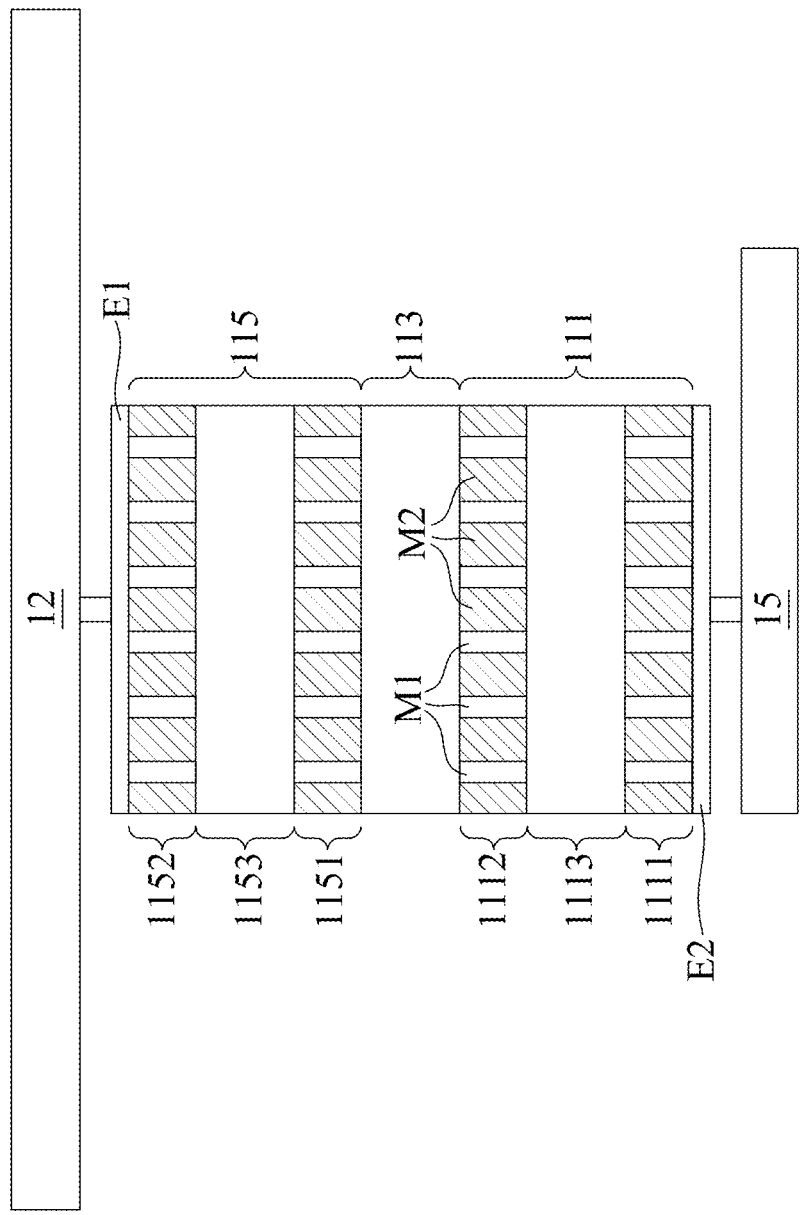
FIG. 2 is a partial schematic diagram of a magnetic tunnel junction in an MRAM according to a first embodiment of the present disclosure.

FIG. 2 shows a partial schematic diagram of a magnetic tunnel junction in an MRAM according to a first embodiment of the present disclosure. As described above, at least one of the magnetic enhancement layers 1111, 1112, 1151 or 1152 is disposed corresponding to at least one of the magnetic fixed layer 111 or the magnetic free layer 115. The magnetic enhancement layer is disposed corresponding to the magnetic fixed layer 111 or the magnetic free layer 115. In the first embodiment, the magnetic fixed layer 111 can include two magnetic enhancement layers 1111 and 1112 and one ferromagnetic material layer 1113, and the magnetic free layer 115 can include two magnetic enhancement layers 1151 and 1152 and one ferromagnetic material layer 1153. In other words, for the magnetic fixed layer 111, a magnetic enhancement layer is provided on both sides close to and away from the tunnel barrier layer 113. Similarly, for the magnetic free layer 115, a magnetic enhancement layer is provided on both sides close to and away from the tunnel barrier layer 113. Each of the magnetic enhancement layers 1111, 1112, 1151 and 1152 includes multiple magnetic columnar structures M1. These magnetic columnar structures M1 have a primary extension direction (for example, the Z direction), which is the same as the stacking direction of the magnetic tunnel junction 11. The magnetic columnar structures M1 may include a ferromagnetic material, for example, Fe, Co, Ni and ruthenium (Ru), and have a length ranging between 0.5 nm and 1 nm. Each of the magnetic enhancement layers 1111, 1112, 1151 and 1152 further includes a dielectric material M2 disposed between the magnetic columnar structures M1. The dielectric material M2 may be, for example, an oxide or a nitrogen oxide of one or more of magnesium (Mg), silicon (Si), titanium (Ti), barium (Ba), calcium (Ca), lanthanum (La), aluminum (Al), manganese (Mn), vanadium (V) and hafnium (Hf).

In this embodiment, the magnetic enhancement layers 1111 and 1112 are distinguishable regions of the magnetic fixed layer 111, and the magnetic enhancement layers 1151 and 1152 are distinguishable regions of the magnetic free layer 115. For example, by observing a cross section of the magnetic tunnel junction 111 using various types of electron microscopes, the magnetic fixed layer 111 has a distinguishable three-layer structure, including the magnetic enhancement layer 1111, the ferromagnetic material layer 1113 and the magnetic enhancement layer 1112. Such layered structure can be distinguished by having apparent magnetic columnar structures M1 in the magnetic enhancement layers compared with the ferromagnetic material layer 1113 or 1153 and the tunnel barrier layer 113 without magnetic columnar structures M1. Moreover, the magnetic columnar structures M1 of the magnetic enhancement layers and the ferromagnetic material layer 1113 or 1153 can be distinguished based on the different electron scattering and electron penetration levels of different materials in the electron microscope described above. Or, the magnetic columnar structures M1 and the ferromagnetic material layer 1113 or 1153 may have different lattice arrangement directions, and this can also be observed by the electronic microscopes described above to distinguish regions where the two are located.

In addition to using an electronic microscope to observe the structure to distinguish the magnetic enhancement layers in the magnetic fixed layer 111 and the magnetic free layer 115, the magnetic enhancement layers 1111, 1112, 1151 and 1152 in the magnetic fixed layer 111 and the magnetic free layer 115 can also be distinguished by chemical analysis. For example, by using the energy-dispersive X-ray spectroscopy (EDX) technique, high-energy X-rays and corresponding energy levels emitted from different regions in the magnetic fixed layer 111 or the magnetic free layer 115 may be detected. Thus, the composition of a region to be tested may be learned to distinguish the layered structure described above.

With the magnetic enhancement layers disposed in the magnetic fixed layer or the magnetic free layer, the magnetic field strength and vertical directionality in the magnetic fixed layer and magnetic free layer can be concentrated and enhanced, to produce a high-performance vertical anisotropic magnetic film. For example, in a conventional MRAM, to invert the direction of magnetic field of a magnetic tunnel junction, the required critical current density is up to about $10^7$ A/cm$^2$. However, in this embodiment, since the magnetic field strength is effectively enhanced by the magnetic enhancement layers, the current density for inversion can be reduced and the stability of durability of the MRAM can be effectively prolonged. For an STT-MRAM, a current needs to pass through the insulating tunnel layer of the magnetic tunnel junction for both read and write operations, and so the probability of puncturing the magnetic tunnel junction can be significantly reduced if the current required for read and write events can be effectively reduced. Moreover, the magnetic enhancement layers disposed in the magnetic fixed layer can effectively stabilize the direction of magnetization polarization of the magnetic fixed layer and keep the direction of magnetization polarization unchanged during the write operation, prevent simultaneous inversion of the magnetic free layer and the magnetic fixed layer, and reduce the wait time needed for each write operation, hence meeting requirements for modern computation of higher speeds. In addition, the number of the magnetic enhancement layers may be adjusted according to requirements, and the present disclosure provides merely some embodiments for reference.

Figure 3:
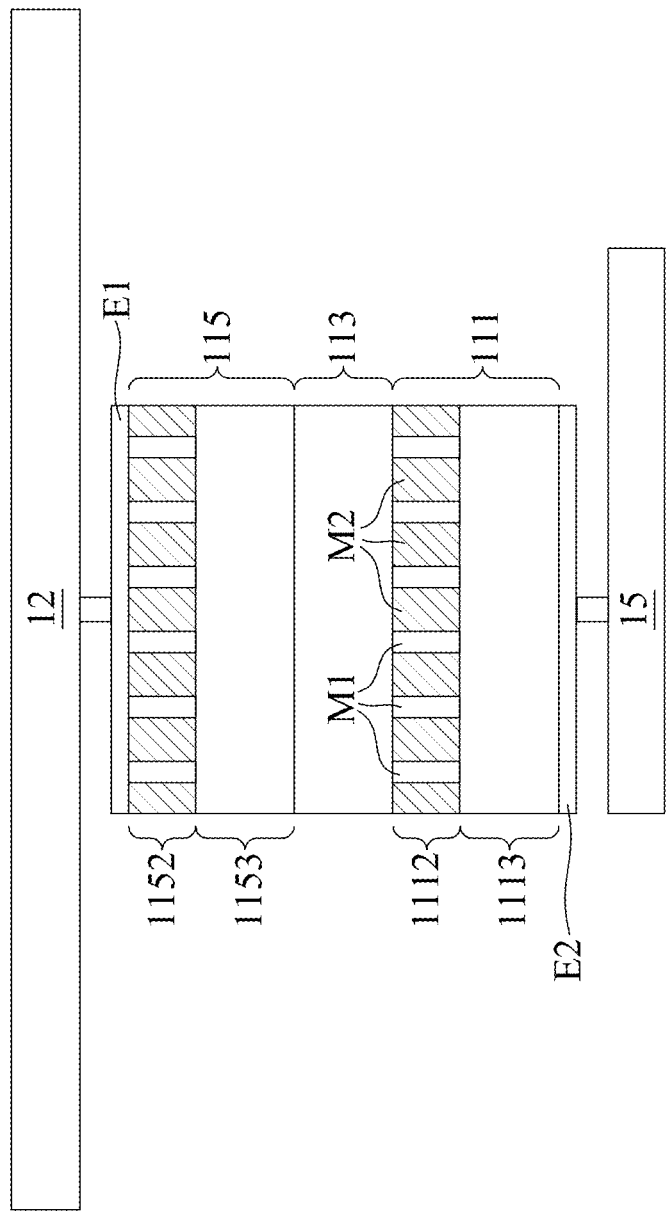
FIG. 3 is a partial schematic diagram of a magnetic tunnel junction in an MRAM according to a second embodiment of the present disclosure.

FIG. 3 shows a partial schematic diagram of a magnetic tunnel junction in an MRAM according to a second embodiment of the present disclosure. In the second embodiment, the magnetic fixed layer 111 includes one magnetic enhancement layer 1112 and one ferromagnetic material layer 1113, the magnetic free layer 115 includes one magnetic enhancement layer 1152 and one ferromagnetic material layer 1153, and the remaining structures are basically the same as those of the first embodiment. A person of ordinary skill in the art can understand that, from perspectives of the first embodiment and the second embodiment, the number, thickness and position of the magnetic enhancement layers in the magnetic fixed layer 111 or the magnetic free layer 115 may be adjusted according to requirements. For example, the magnetic fixed layer 111 may include one or more magnetic enhancement layers, and the magnetic free layer may include one or more magnetic enhancement layers.

Figure 4:
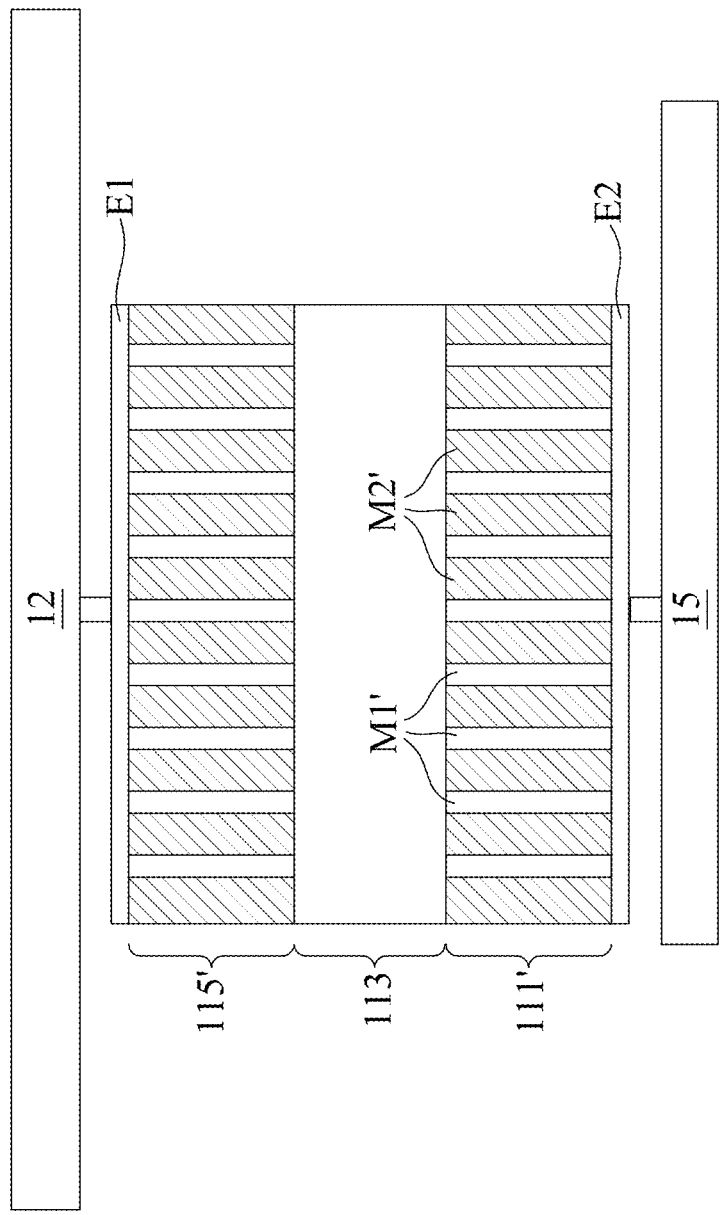
FIG. 4 is a partial schematic diagram of a magnetic tunnel junction in an MRAM according to a third embodiment of the present disclosure.

FIG. 4 shows a partial schematic diagram of a magnetic tunnel junction in an MRAM according to a third embodiment of the present disclosure. In the third embodiment, the magnetic enhancement layer and the magnetic fixed layer together form a first composite layer 111', and/or the magnetic enhancement layer and the magnetic free layer together form a second composite layer 115'. Each of the first composite layer 111' and the second composite layer 115' includes magnetic columnar structures M1' and a dielectric material M2'. The dielectric material M2' is disposed in or fills a gap between the magnetic columnar structures M1'. The magnetic columnar structures M1' and the dielectric material M2' may be the same as the magnetic columnar structures M1 and the dielectric material M2 of the foregoing embodiments, and repeated details are omitted herein. Since the magnetic columnar structures of the magnetic enhancement layer may include the ferromagnetic material in the magnetic fixed layer and the magnetic free layer, the magnetic enhancement layer may be together integrated with the magnetic fixed layer or the magnetic free layer to from one composite layer 111' or 115'. Moreover, the third embodiment may also be combined with the first or second embodiment. For example, the magnetic fixed layer 111 in FIG. 3 may be a composite layer (for example, the composite layer 111' in FIG. 4), and the magnetic free layer 115 in FIG. 3 may be a structure of a magnetic enhancement layer having distinguishable regions (for example, the magnetic enhancement layers 1151 and 1152 and the ferromagnetic material layer 1153 in FIG. 2).

Refer to FIG. 2 to FIG. 4. In these embodiments, a manufacturing process of the magnetic enhancement layer or the composite layer may be: forming a dielectric material layer, for example, an oxide or a nitrogen oxide of one or more of magnesium (Mg), silicon (Si), titanium (Ti), barium (Ba), calcium (Ca), lanthanum (La), aluminum (Al), manganese (Mn), vanadium (V), and hafnium (Hf); defining multiple hole regions in the dielectric material layer by an appropriate patterning or etching process (for example, wet or dry etching); and forming multiple magnetic columnar structures extending along the stacking direction of the magnetic tunnel junction in the hole regions of the dielectric material layer by an electroplating process.

Figure 5A:
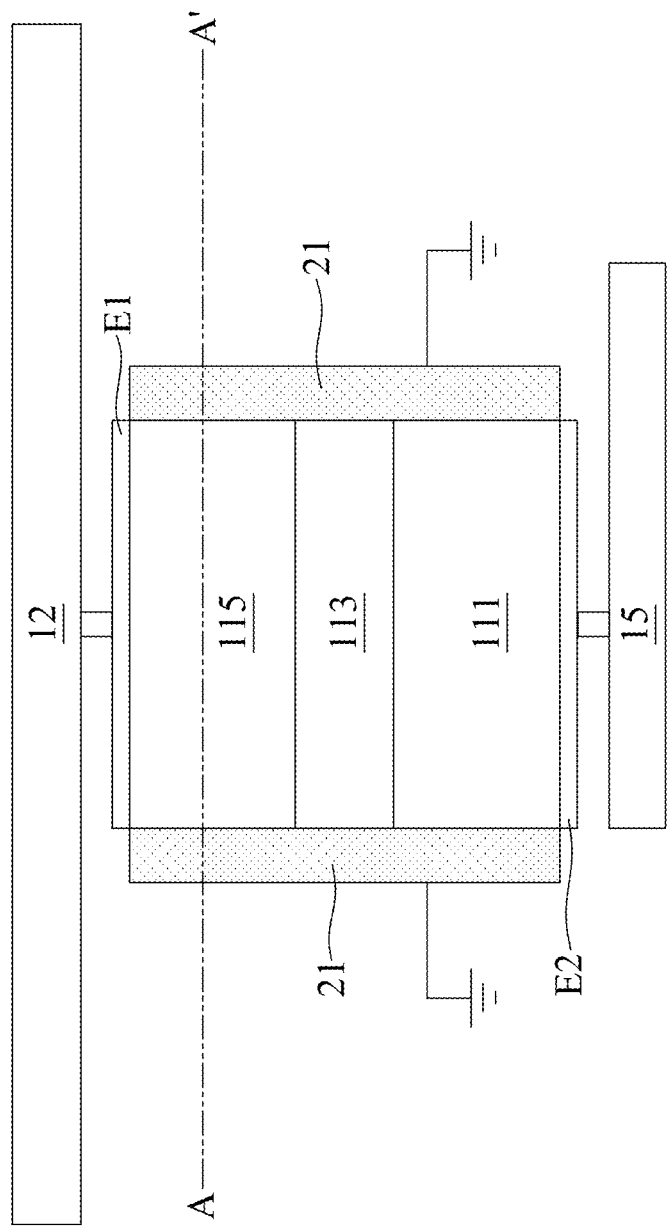
FIG. 5A is a partial schematic diagram of a magnetic tunnel junction in an MRAM according to a fourth embodiment of the present disclosure.
Figure 5B:
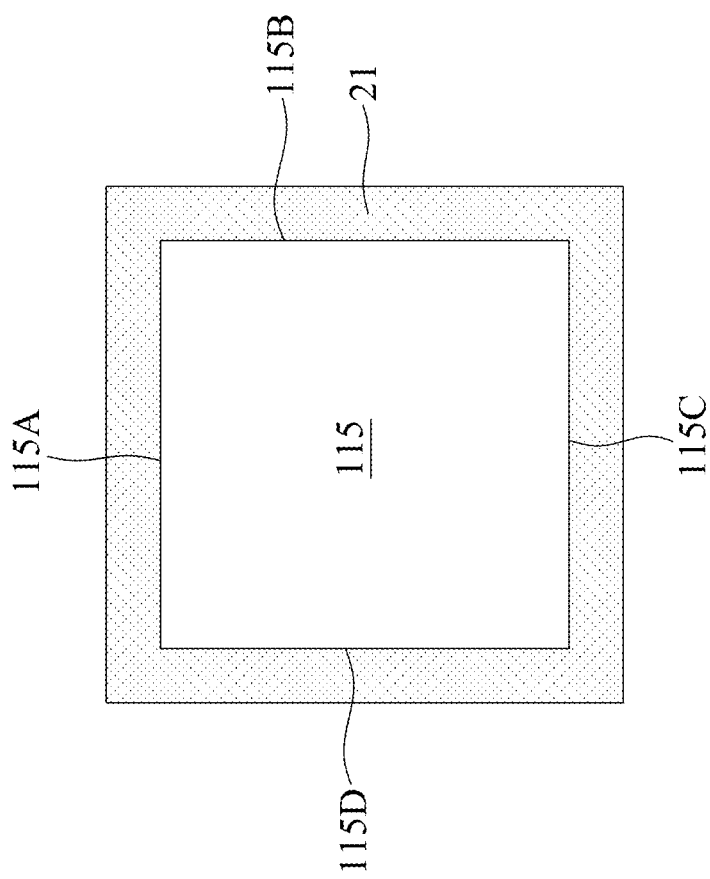
FIG. 5B is a cross-sectional schematic diagram along the line A-A' in FIG. 5A.
Figure 5B:
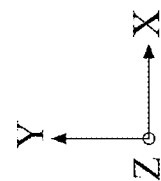

In some embodiments of the present disclosure, an upper surface, a lower surface and at least one of any side surfaces of the magnetic tunnel junction may be surrounded by one or more electromagnetic wave absorption or barrier layers. FIG. 5A shows a partial schematic diagram of a magnetic tunnel junction of an MRAM according to a fourth embodiment of the present disclosure. FIG. 5B shows a cross-sectional schematic diagram along the line A-A' in FIG. 5A. In the fourth embodiment, side surfaces 115A, 115B, 115C and 115D of the magnetic tunnel junction 11 (including the magnetic fixed layer 111, the tunnel barrier layer 113 and the magnetic free layer 115) are surrounded by an electromagnetic wave absorption or barrier layer. Specifically, the electromagnetic wave absorption or barrier layer may include one of a non-magnetic ferrite 21 or a conductive layer (including a copper wire 12 or 15). The non-magnetic ferrite 21 may be designed to be grounded. For example, since the non-magnetic ferrite 21 has a high resistance, directly contacting at least one of any side surfaces of the magnetic tunnel junction 11 may not affect writing and reading the memory. Taking the electromagnetic wave absorption or barrier layer including the non-magnetic ferrite 21 as an example, it can absorb electromagnetic wave signals from the outside to prevent the magnetization direction inside the magnetic tunnel junction 11 from being disturbed by the external magnetic field change. Moreover, in this embodiment, the upper surface of the magnetic tunnel junction 11 may be covered by the projection of the bit line 12 (for example, the structure of a conductive layer such as a copper wire), and the lower surface of the magnetic tunnel junction 11 may be covered by the projection of the conductive structure 15 (for example, the structure of a conductive layer such as a copper wire). Thus, even if the upper surface or the lower surface of the magnetic tunnel junction 11 is not covered by the non-magnetic ferrite, the bit line 12 and the conductive structure 15 can still produce electromagnetic shielding effects, preventing the direction of magnetization inside the magnetic tunnel junction 11 from interference of external magnetic field changes. In some embodiments, a size (for example, a width of a copper wire from the perspective of a top view angle) of the structure of the conductive layer such as a copper wire is greater than a size (for example, a diameter of the magnetic tunnel junction from the perspective of a top view angle) of the magnetic tunnel junction 11, thereby achieving better shielding effects.

Figure 6A:
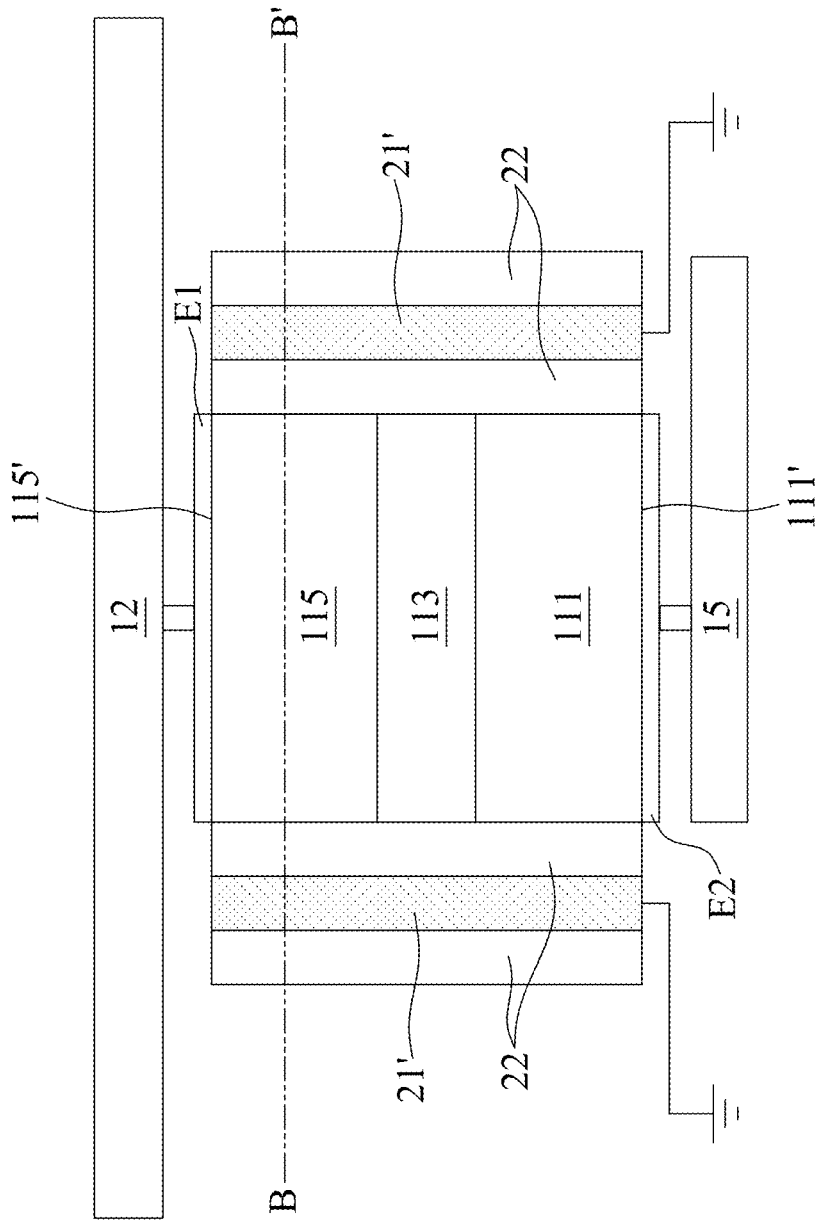
FIG. 6A is a partial schematic diagram of a magnetic tunnel junction in an MRAM according to a fifth embodiment of the present disclosure.
Figure 6B:
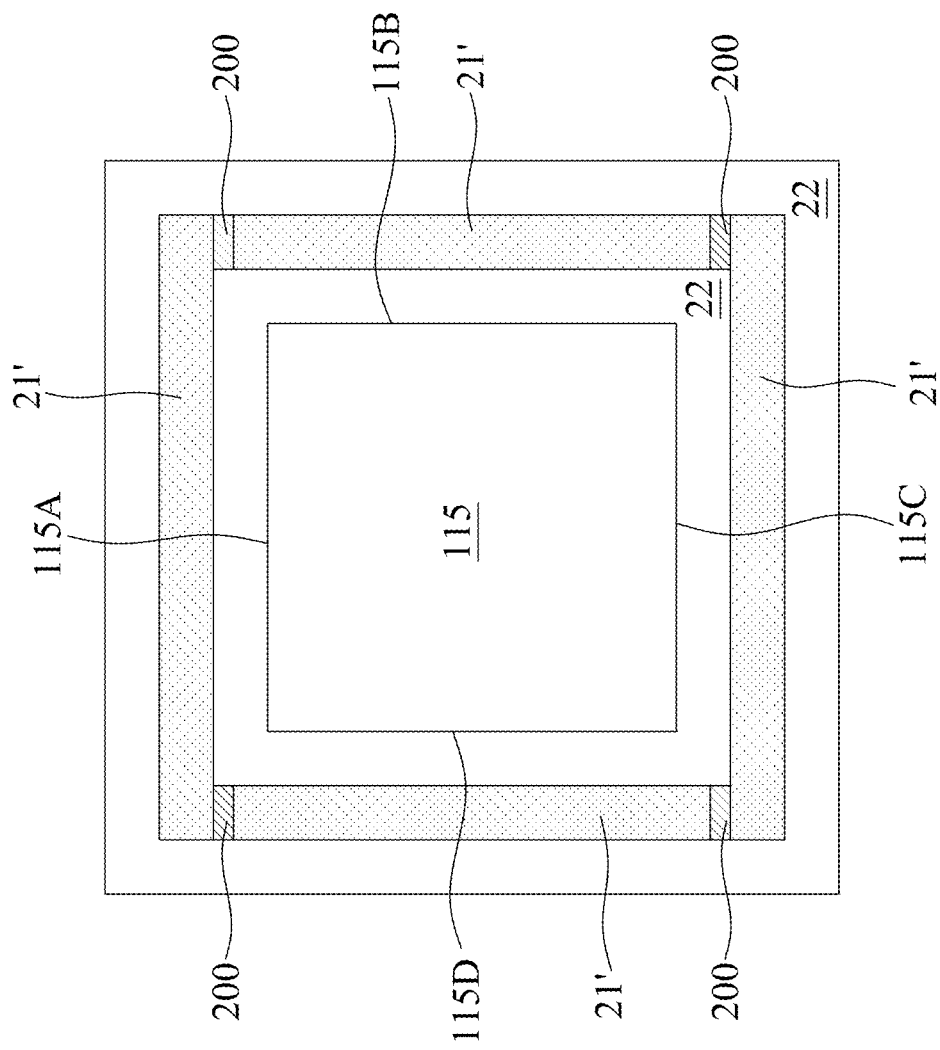
FIG. 6B is a cross-sectional schematic diagram along the line B-B' in FIG. 6A.

FIG. 6A shows a partial schematic diagram of a magnetic tunnel junction of an MRAM according to a fifth embodiment of the present disclosure. FIG. 6B shows a cross-sectional schematic diagram along the line B-B' in FIG. 6A. In the fifth embodiment, the side surfaces 115A, 115B, 115C and 115D of the magnetic tunnel junction 11 are surrounded by an electromagnetic wave absorption or barrier layer and a non-magnetic insulator layer 22, and the electromagnetic wave absorption or barrier layer may include one of a magnetic ferrite 21' or a conductive layer (including a copper wire 12 or 15). The magnetic ferrite 21' is separated from at least one of any side surfaces of the magnetic tunnel junction 11 by the non-magnetic insulator layer 22. In the fourth and fifth embodiments, by surrounding the outer side of the magnetic tunnel junction 11 with an electromagnetic wave absorption or barrier layer, the magnetic field state of the magnetic tunnel junction can be less susceptible to interference from external signals. The fifth embodiment is different from the fourth embodiment in that the magnetic ferrite 21' in the electromagnetic wave absorption or barrier layer is not in direct contact with at least one of any side surfaces 115A, 115B, 115C and 115D of the magnetic tunnel junction 11. By additionally providing a non-magnetic insulator layer 22, and separating the four sides of the magnetic ferrite 21' from each other by an insulating and non-magnetic material 200 (such as silicon dioxide) as shown in FIG. 6B, when the electromagnetic wave absorption or barrier layer is a magnetic ferrite, the strength of a horizontal magnetic field thereof may be set (to be about 1/10 of the magnetic field strength of the magnetic free layer 115) before the manufacturing process of the MRAM, generating magnetic coupling with the magnetic free layer 115 and causing the vertical magnetic field of the magnetic free layer 115 to deviate from the vertical line by about 5 degrees, hence reducing the magnitude of the current for writing into the memory to change the stored information. This method can achieve the object of field-free switching currently using a wedge structural design of an MRAM. Moreover, this structure can isolate the magnetic tunnel junction 11 from the exterior to provide dual effects. In some embodiments, the non-magnetic insulator layer 22 may include, for example, an oxide or a nitrogen oxide.

Figure 7A:
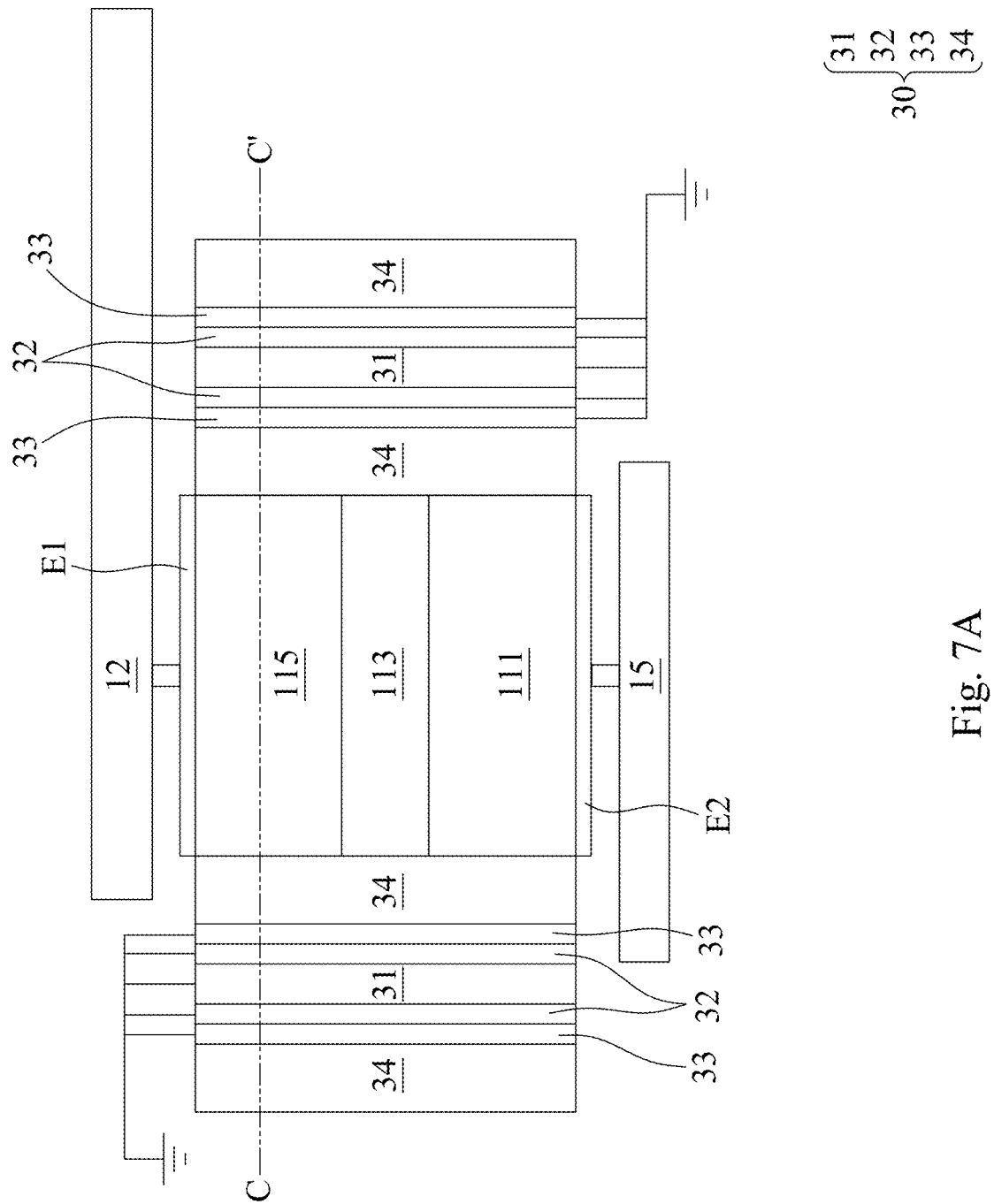
FIG. 7A is a partial schematic diagram of a magnetic tunnel junction in an MRAM according to a sixth embodiment of the present disclosure.
Figure 7B:
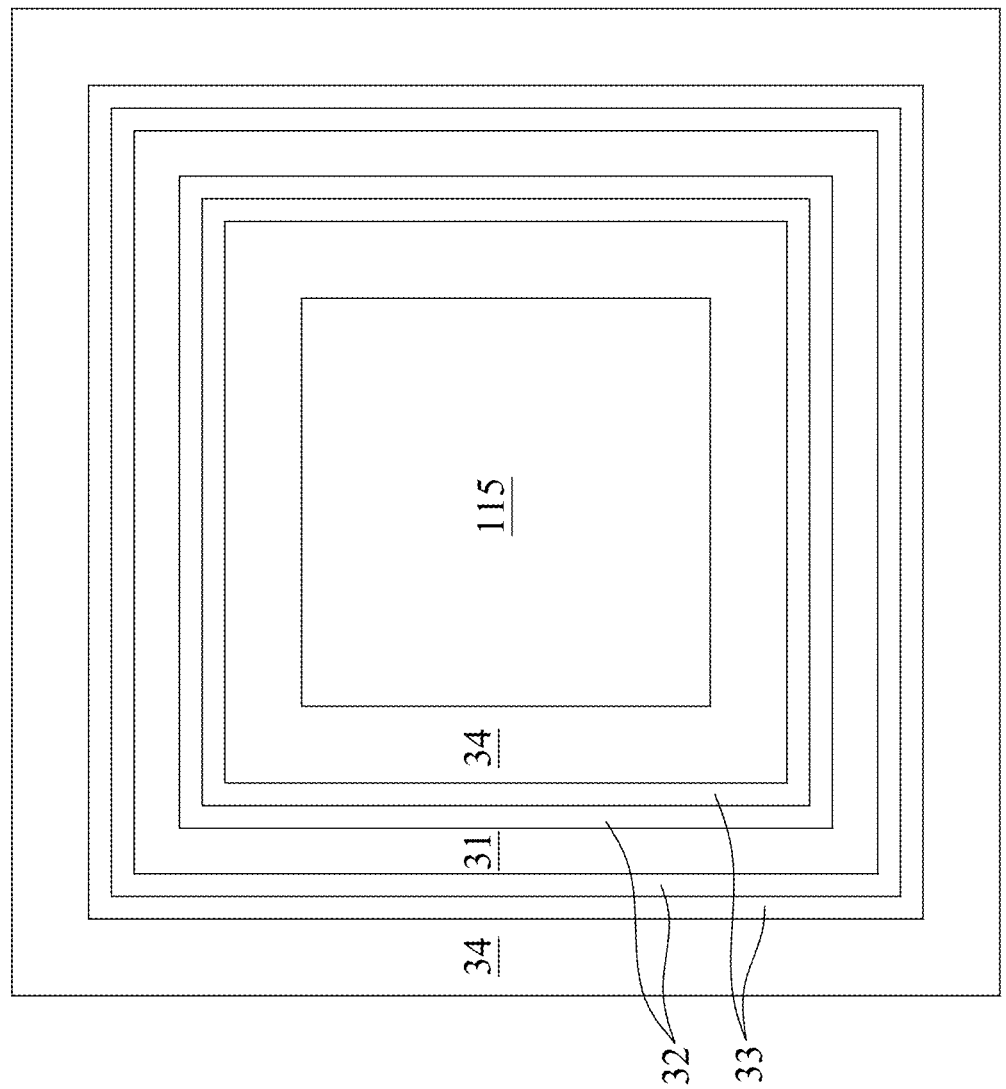
FIG. 7B is a cross-sectional schematic diagram along the line C-C' in FIG. 7A.

FIG. 7A shows a partial schematic diagram of a magnetic tunnel junction 11 of an MRAM according to a sixth embodiment of the present disclosure. FIG. 7B shows a cross-sectional schematic diagram along the line C-C' in FIG. 7A. In the sixth embodiment, the electromagnetic wave absorption or barrier layer disposed outside the magnetic tunnel junction 11 includes a conductive layer (for example, a peripheral structure 30 of a pseudo-coaxial cable). The peripheral structure 30 of the pseudo-coaxial cable is disposed on at least one of any side surfaces of the magnetic tunnel junction 11 and extends along the stacking direction of the magnetic tunnel junction 11. In general, the coaxial cable includes a structure including an inner wire, an inner insulating layer, an outer wire and an outer insulating layer. In this embodiment, the peripheral structure of the pseudo-coaxial cable structure may include a peripheral conductive structure and a peripheral insulating structure. For example, referring to FIG. 7B, the peripheral structure of the pseudo-coaxial cable refers to a structure to be grounded such as the outer wire and the outer insulating layer, and the magnetic tunnel junction 11 located at the center is used in substitution for a conventional inner wire structure. For example, the peripheral structure 30 of the pseudo-coaxial cable may include a copper layer 31, a phosphor-copper alloy layer 32, a barrier layer 33 and insulator layer 34. The copper layer 31 is adjacent to the phosphor-copper alloy layer 32, or is surrounded on the periphery thereof by the phosphor-copper alloy layer 32. The phosphor-copper alloy layer 32 may include copper phosphide ($Cu_3P$), which is adjacent to the copper layer 31 and can serve as a seed layer, an adhesion layer and a partial diffusion barrier, and can also prevent the copper layer 31 from being oxidized during the manufacturing process. The barrier layer 33 may be grounded, and includes, for example, titanium nitride (TiN). As shown in FIG. 7A, the copper layer 31 and/or the phosphor-copper alloy layer 32 may be grounded, thereby generating electromagnetic shielding effects for the magnetic tunnel junction 11.

The fourth to sixth embodiments above describe examples of disposing the electromagnetic wave absorption or barrier layer outside the magnetic tunnel junction. For upper and lower surfaces of the magnetic tunnel junction, as described above, the copper wires of the bit line 12 and the conductive structure 15 provide shielding effects, that is, the bit line 12 and the conductive structure 15 are respectively located on the upper surface and the lower surface of the magnetic tunnel junction 11, and are configured to shield the magnetic tunnel junction 11 and transmit signals to the magnetic tunnel junction 11 to perform read/write operations thereof.

Figure 8:
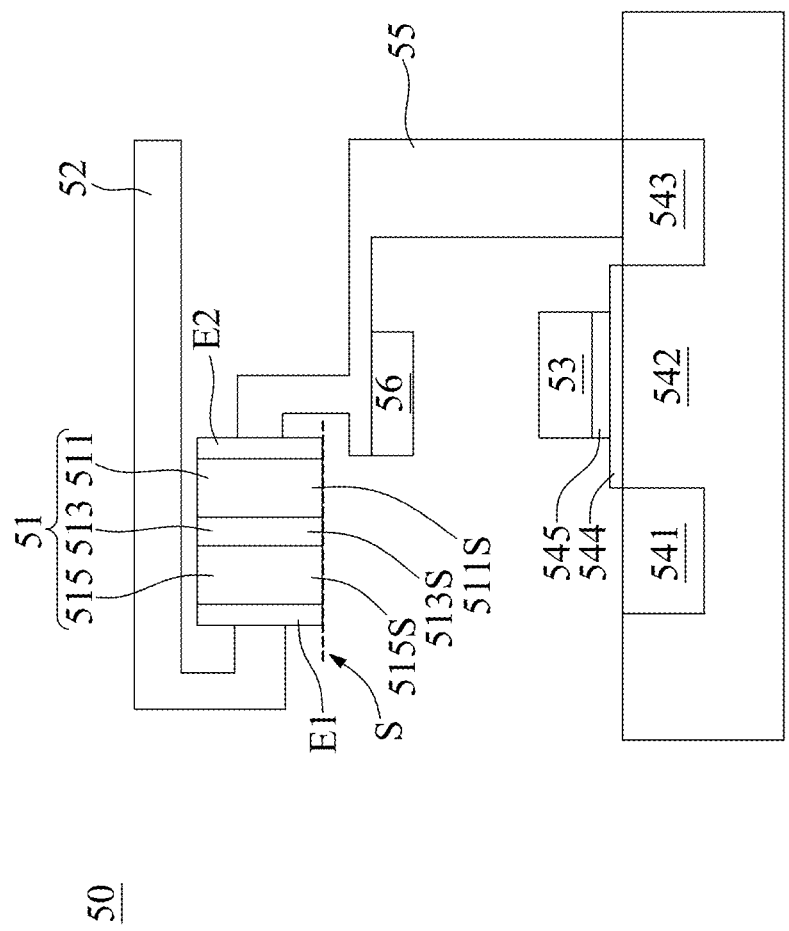
FIG. 8 is a schematic diagram of an MRAM according to another embodiment of the present disclosure.

FIG. 8 shows a schematic diagram of an MRAM according to another embodiment of the present disclosure. As shown in FIG. 8, an MRAM 50 includes a magnetic tunnel junction (MTJ) 51, a bit line 52, a read word line 53 and a transistor structure 54. The magnetic tunnel junction 51 includes a magnetic fixed layer 511, a tunnel barrier layer 513 and a magnetic free layer 515. The bit line 52 is connected to one of the magnetic free layer 515 and the magnetic fixed layer 511. The transistor structure 54 is electrically connected to the magnetic tunnel junction 51. In some embodiments, the read word line 53 may be connected to or electrically connected to a gate region 545 of the transistor structure 54, and is used to control an on/off state of the transistor structure 54. In this embodiment, a bottom surface 515S of the magnetic free layer 515, a bottom surface 513S of the tunnel barrier layer 513 and a bottom surface 511S of the magnetic fixed layer 511 form a coplanar surface S, for example, a coplanar surface along the horizontal direction (the X direction). In this embodiment, the magnetic fixed layer 511, the tunnel barrier layer 513 and the magnetic free layer 515 are arranged along a horizontal direction (the X direction); however, the present disclosure does not intend to limit the arrangement sequence of the magnetic fixed layer 511, the tunnel barrier layer 513 and the magnetic free layer 515. That is, in this embodiment, the bit line 52 may be connected to the magnetic free layer 515 via an electrode E1, and a conductive structure 55 for writing and reading data may be connected to the magnetic fixed layer 511 via an electrode E2. However, in other embodiments, the bit line 52 may be connected to the magnetic fixed layer 511, and the conductive structure 55 may be connected to the magnetic free layer 515. As shown in FIG. 8, the MRAM 50 may selectively include a write line 56, which may be used to write data to the magnetic tunnel junction 51.

Figure 9:
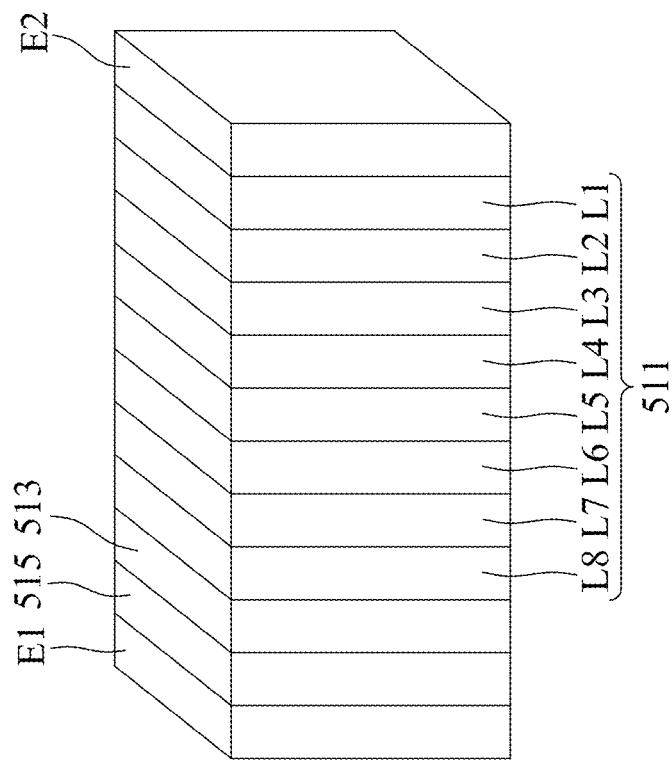
FIG. 9 is a schematic diagram of a magnetic tunnel junction in an MRAM according to a seventh embodiment of the present disclosure.

Refer to the embodiments above regarding details of materials of the magnetic fixed layer 511, the tunnel barrier layer 513 and the magnetic free layer 515, and such details are omitted herein. The difference between this embodiment and the previous embodiments is that, the magnetic fixed layer 511, the tunnel barrier layer 513 and the magnetic free layer 515 are in a horizontal arrangement, so that in the manufacturing process, multiple layers with the same repetitive structure can be manufactured in a single semiconductor fabrication process, thereby shortening the manufacturing time. FIG. 9 shows a schematic diagram of a magnetic tunnel junction in an MRAM according to a seventh embodiment of the present disclosure. In the seventh embodiment, the magnetic fixed layer 511 may include multiple ferromagnetic material layers and non-ferromagnetic material layers arranged side-by-side. For example, the first layer body L1 includes platinum (for example, in a thickness of 5 nm), the second layer body L2 includes a stacked structure of cobalt and platinum (for example, a side-by-side structure including 6 layers of cobalt in a thickness of 0.5 nm and platinum in a thickness of 0.3 nm), the third layer body L3 includes cobalt (for example, in a thickness of 0.5 nm), the fourth layer body LA includes ruthenium, the fifth layer body L5 includes a stacked structure of cobalt and platinum (for example, a side-by-side structure including 2 layers of cobalt in a thickness of 0.5 nm and platinum in a thickness of 0.3 nm), the sixth layer body L6 includes cobalt (for example, in a thickness of 0.5 nm), the seventh layer body L7 includes tantalum (Ta), and the eighth layer body L8 includes cobalt iron boron (for example, in a thickness of 1.3 nm).

Through the arrangement of multi-layer structure of ferromagnetic layer/non-ferromagnetic layer/ferromagnetic layer, a synthetic antiferromagnetic (SAF) material can be formed, which has a higher magnetic coupling strength and is able to prevent changes in the magnetic field direction caused by thermal disturbance and enhance the anti-interference ability of the magnetic tunnel junction 51. Moreover, the structure of the multilayer arrangement of this embodiment is also applicable to the magnetic tunnel junction 11 in the first to sixth embodiments. However, noted that with the multilayer synthetic anti-ferromagnetic material formed in the magnetic tunnel junction 51 in a horizontal arrangement, compared with the previous vertical arrangement of the embodiments, multiple layers of repeated structures with the same composition can be formed in a single semiconductor fabrication process, thereby shortening the process time and improving efficiency. For example, all the first layer body L1, the second layer body L2 and the fifth layer body L5 include platinum so they can be formed at the same time; all the second layer body L2, the third layer body L3, the fifth layer body L5 and the sixth layer body L6 include cobalt so they can be formed at the same time. Thus, compared to a vertically stacked structure in which each layer is sequentially formed by its respective semiconductor fabrication process, the semiconductor fabrication process steps for horizontal arrangement of the magnetic tunnel junction 51 are effectively reduced, thereby shortening the manufacturing time.

Figure 10:
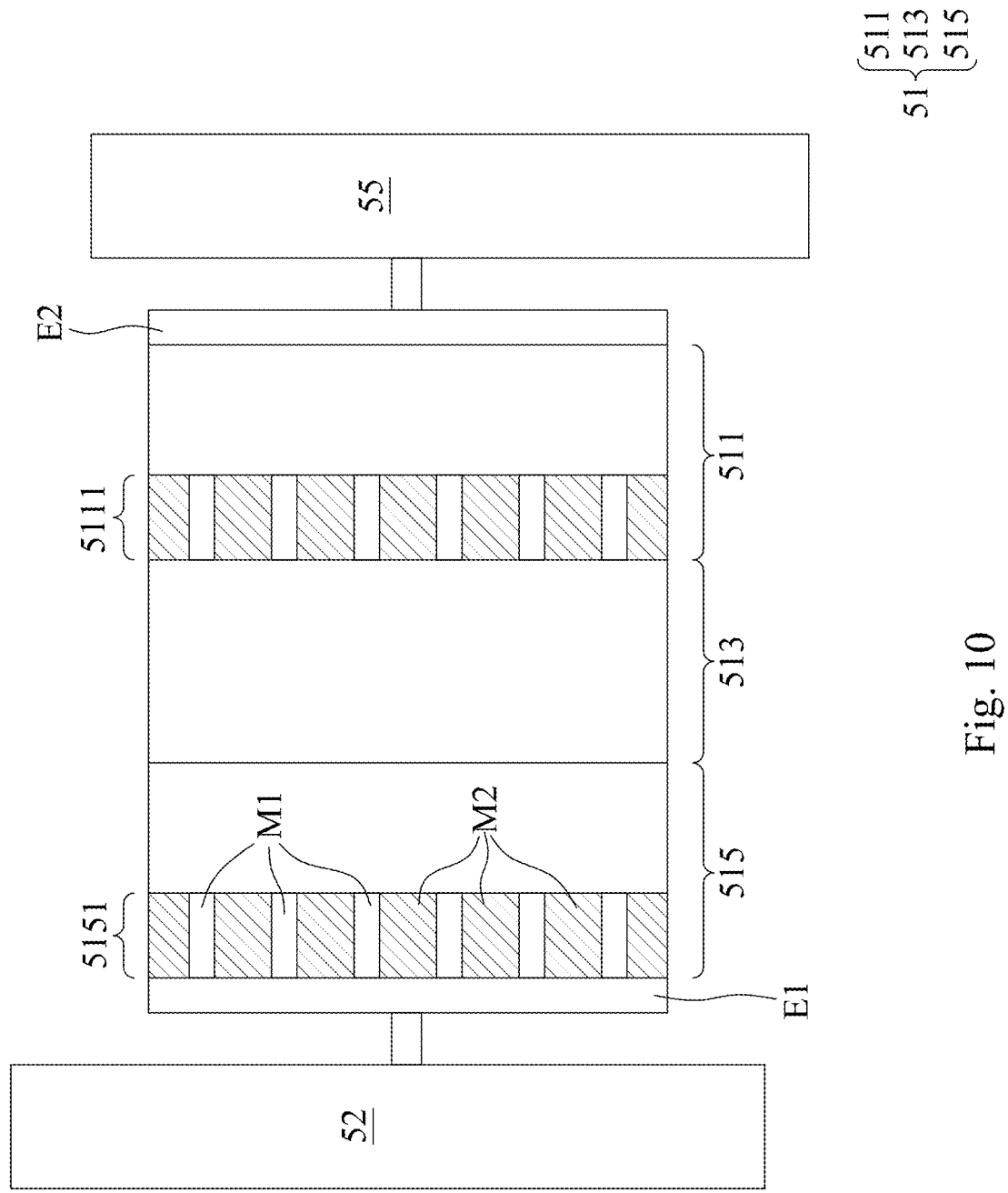
FIG. 10 is a partial schematic diagram of a magnetic tunnel junction in an MRAM according to an eighth embodiment of the present disclosure.

FIG. 10 shows a partial schematic diagram of a magnetic tunnel junction in an MRAM according to an eighth embodiment of the present disclosure. In the eighth embodiment, the magnetic tunnel junction 51 further includes at least one magnetic enhancement layer 5111 or 5151, which is disposed corresponding to at least one of the magnetic free layer 515 or the magnetic fixed layer 511. The magnetic enhancement layers 5111 and 5151 may include magnetic columnar structures M1 and a dielectric material M2. Regarding the magnetic columnar structure M1 being disposed correspondingly to at least one of the magnetic free layer 515 and/or the magnetic fixed layer 511, and the composition of the dielectric material M2 surrounding the magnetic columnar structure M1, reference can be made to the previous embodiments and the repeated description is omitted herein. The main difference between the eighth embodiment and the second embodiment is that, the magnetic fixed layer 511, the tunnel barrier layer 513 and the magnetic free layer 515 in the magnetic tunnel junction 51 of this embodiment are disposed along a horizontal direction (for example, the X direction), and a primary extension direction of the magnetic columnar structures M1 extends along the horizontal direction (for example, the X direction).

Figure 11:
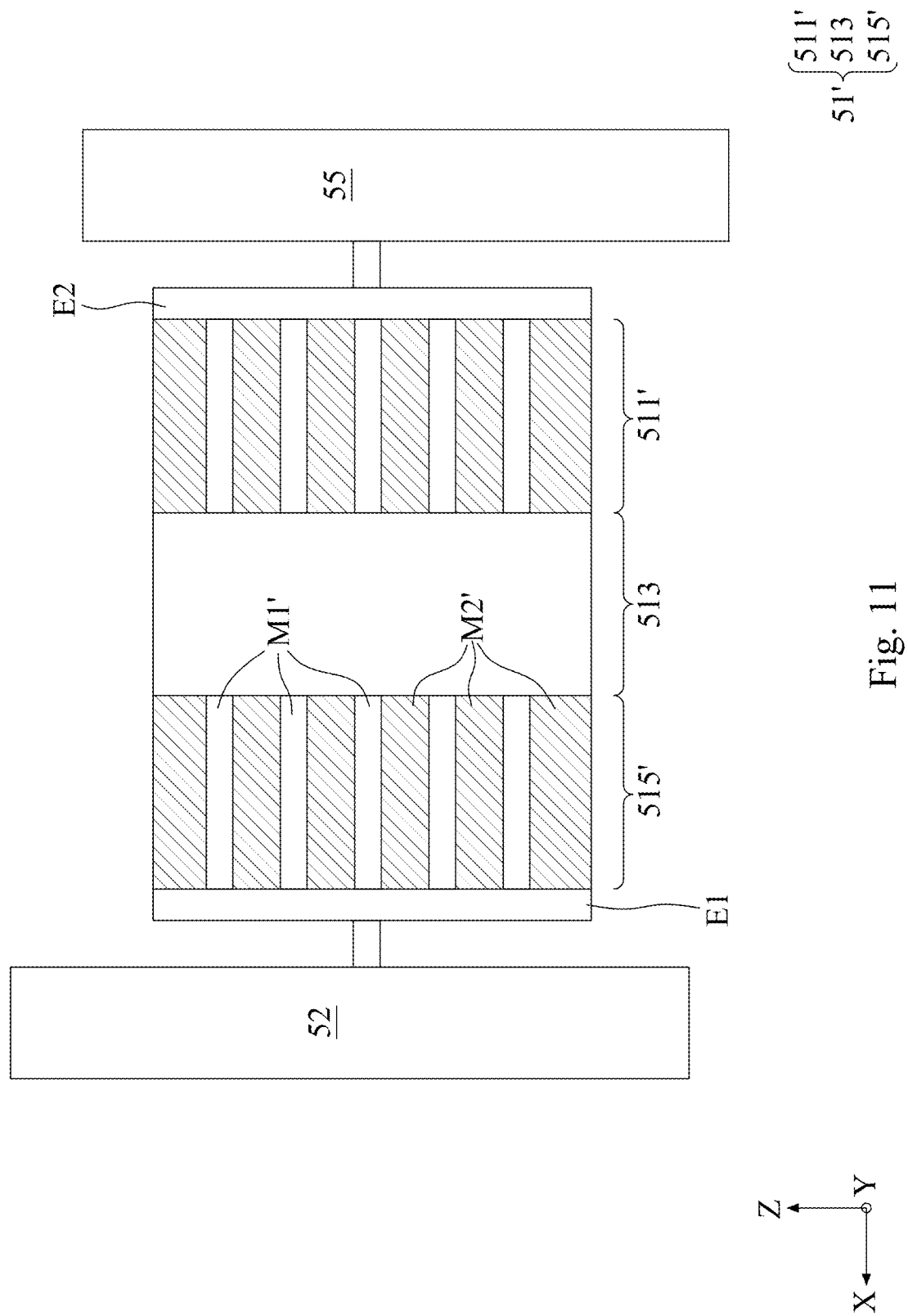
FIG. 11 is a partial schematic diagram of a magnetic tunnel junction in an MRAM according to a ninth embodiment of the present disclosure.

FIG. 11 shows a partial schematic diagram of a magnetic tunnel junction in an MRAM according to a ninth embodiment of the present disclosure. In the ninth embodiment, the magnetic enhancement layer and the magnetic fixed layer together form a first composite layer 511', and/or the magnetic enhancement layer and the magnetic free layer together form a second composite layer 515'. Each of the first composite layer 511' and the second composite layer 515' includes magnetic columnar structures M1' and a dielectric material M2'. The dielectric material M2' is disposed in or fills a gap between the magnetic columnar structures M1'. Refer to those previous embodiments above regarding details of how the magnetic columnar structures M1' and the magnetic fixed layer 511' and/or the magnetic free layer 515' respectively together form a first composite layer 511' and/or a second composite layer 515', and the compositions surrounding the magnetic columnar structures M1', and such details are omitted herein. Since the magnetic columnar structures of the magnetic enhancement layer may include the ferromagnetic material in the magnetic fixed layer and the magnetic free layer, the magnetic enhancement layer may be together integrated with the magnetic fixed layer or the magnetic free layer to from one composite layer 511' or 515'. In the eighth and ninth embodiment, the magnetic columnar structures have a primary extension direction (for example, the X direction), which is the same as the side-by-side arrangement direction of the magnetic tunnel junction 51.

Refer to FIG. 10 and FIG. 11. In these embodiments, the horizontally arranged magnetic tunnel junction 51 can be formed with multiple layers of the same repeated structure in a single semiconductor fabrication process of deposition to shorten the process time and improve efficiency, the magnetic enhancement layer or the composite layer can also be formed by electroplating before or after other deposition steps. For example, multiple hole regions are defined at the dielectric material M2/M2' by an appropriate patterning and etching process (for example, wet or dry etching), and the multiple magnetic columnar structures M1/M1' extending along the stacking direction (the X direction) of the magnetic tunnel junction are formed in the hole regions of the dielectric material M2/M2' by an electroplating process.

Figure 12A:
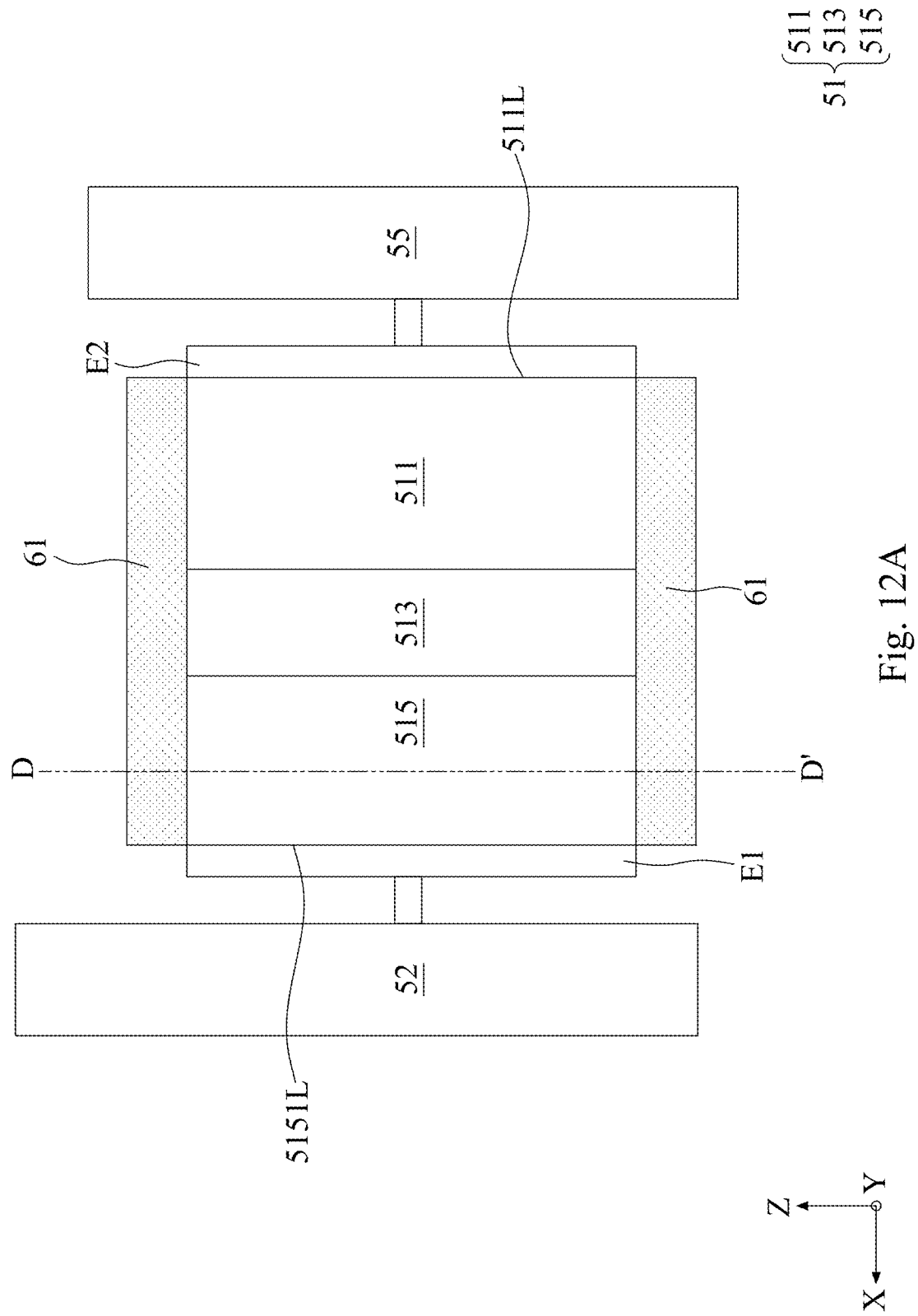
FIG. 12A is a partial schematic diagram of a magnetic tunnel junction in an MRAM according to a tenth embodiment of the present disclosure.
Figure 12B:
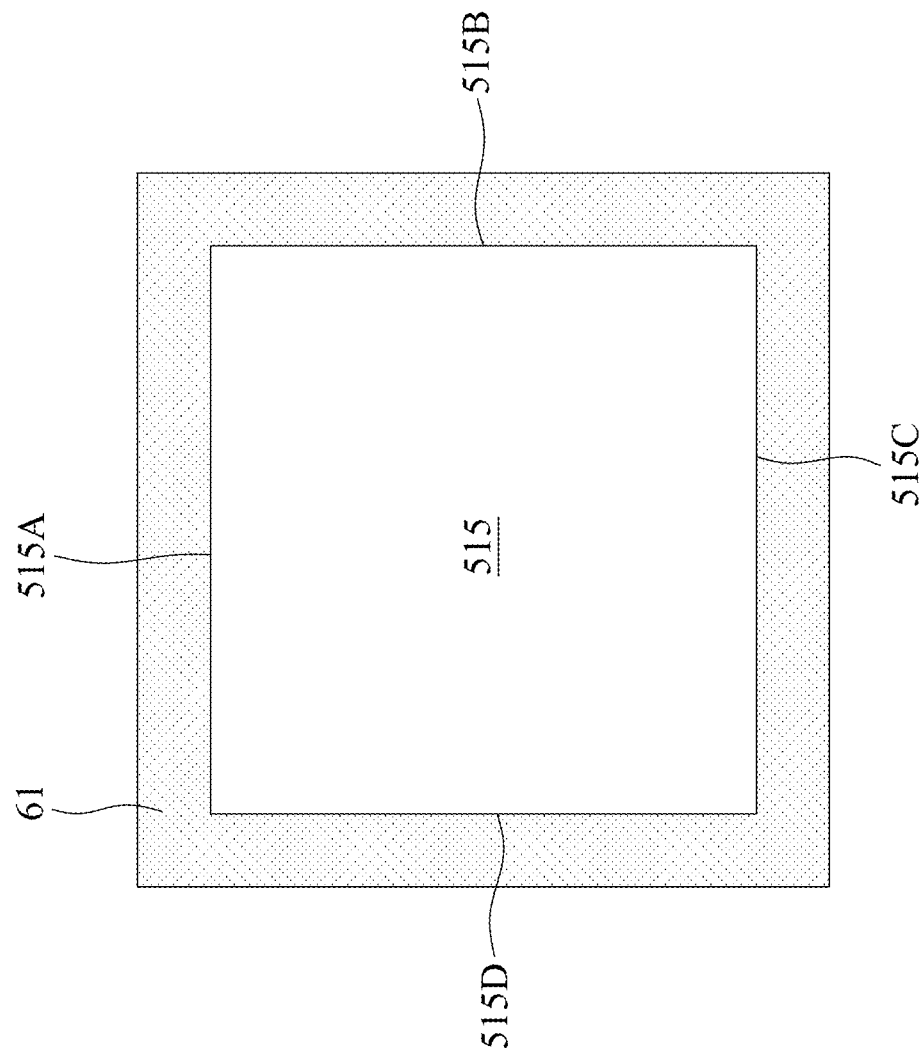
FIG. 12B is a cross-sectional schematic diagram along the line D-D' in FIG. 12A.

FIG. 12A shows a partial schematic diagram of a magnetic tunnel junction in an MRAM according to a tenth embodiment of the present disclosure. FIG. 12B shows a cross-sectional schematic diagram along the line D-D' in FIG. 12A. In the tenth embodiment, directions of magnetization of both the magnetic free layer 515 and the magnetic fixed layer 511 are the horizontal direction. The magnetic tunnel junction 51 is perpendicular to the side-by-side arrangement direction (the X direction), and has a first surface 515L electrically connected to the first electrode E1, a second surface 511L electrically connected to the second electrode E2, or at least one of a third surface 515A, a fourth surface 515B, a fifth surface 515C or a sixth surface 515D parallel to the side-by-side arrangement direction (the X direction) surrounded by one or more electromagnetic wave absorption or barrier layer. Specifically, the electromagnetic wave absorption or barrier layer can include one of a non-magnetic ferrite 61 and a conductive layer (including a copper wire 52 or 55). The non-magnetic ferrite 61 can be designed to be partial-outside grounded (internal side cannot be ground (not shown)). For example, since the non-magnetic ferrite 61 has a high resistance, directly contacting at least one of any side surfaces of the magnetic tunnel junction 51 may not affect writing and reading the memory. For example, the electromagnetic wave absorption or barrier layer including the non-magnetic ferrite 61 can absorb electromagnetic wave signals from the exterior, thus preventing the direction of magnetization inside the magnetic tunnel junction 51 from interference of external magnetic field changes. The non-magnetic ferrite 61 described above can be in direct contact with at least one of the third surface 515A, the fourth surface 515B, the fifth surface 515C or the sixth surface 515D of the magnetic tunnel junction 51. For example, the electromagnetic wave absorption or barrier layer can be in direct contact with the third surface 515A, the fourth surface 515B, the fifth surface 515C and the sixth surface 515D of the magnetic tunnel junction 51. Moreover, the first surface 515L of the magnetic tunnel junction 51 can be covered by the lateral projection of the bit line 52 (for example, the structure of a conductive layer such as a copper wire), and the second surface 511L of the magnetic tunnel junction 51 can be covered by the lateral projection of the conductive structure 55 (for example, the structure of a conductive layer such as a copper wire). Thus, even if the first surface 515L or the second surface 511L of the magnetic tunnel junction 51 is not covered by the non-magnetic ferrite, the bit line 52 and the conductive structure 55 can still produce electromagnetic shielding effects, preventing the direction of magnetization inside the magnetic tunnel junction 51 from interference of external magnetic field changes. In some embodiments, a size (for example, a width of a copper wire from the perspective along the X direction) of the structure of the conductive layer such as the copper wire is greater than a size (for example, a diameter of the magnetic tunnel junction from the perspective along the X direction) of the magnetic tunnel junction 51, thereby achieving better shielding effects.

Figure 13A:
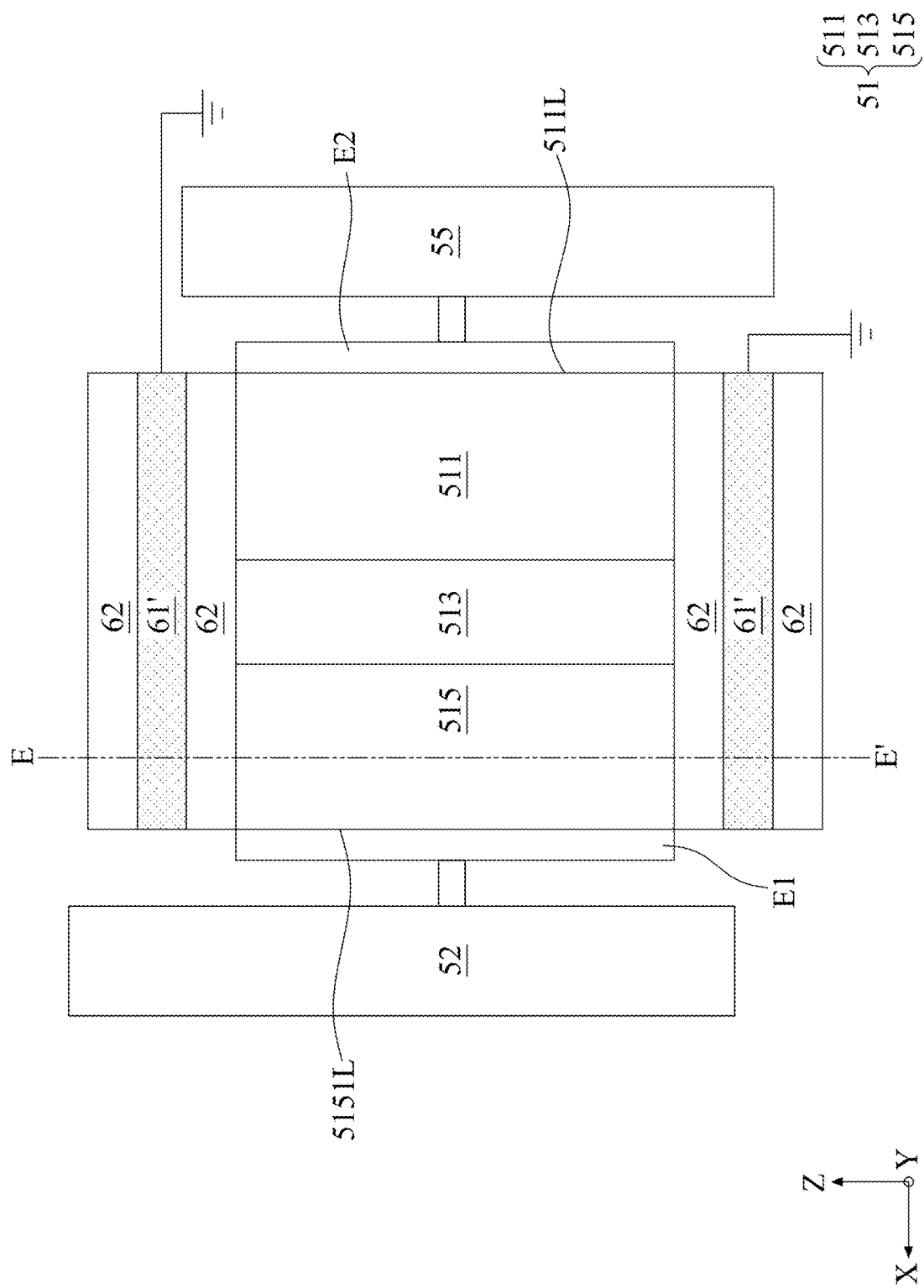
FIG. 13A is a partial schematic diagram of a magnetic tunnel junction in an MRAM according to an eleventh embodiment of the present disclosure.
Figure 13B:
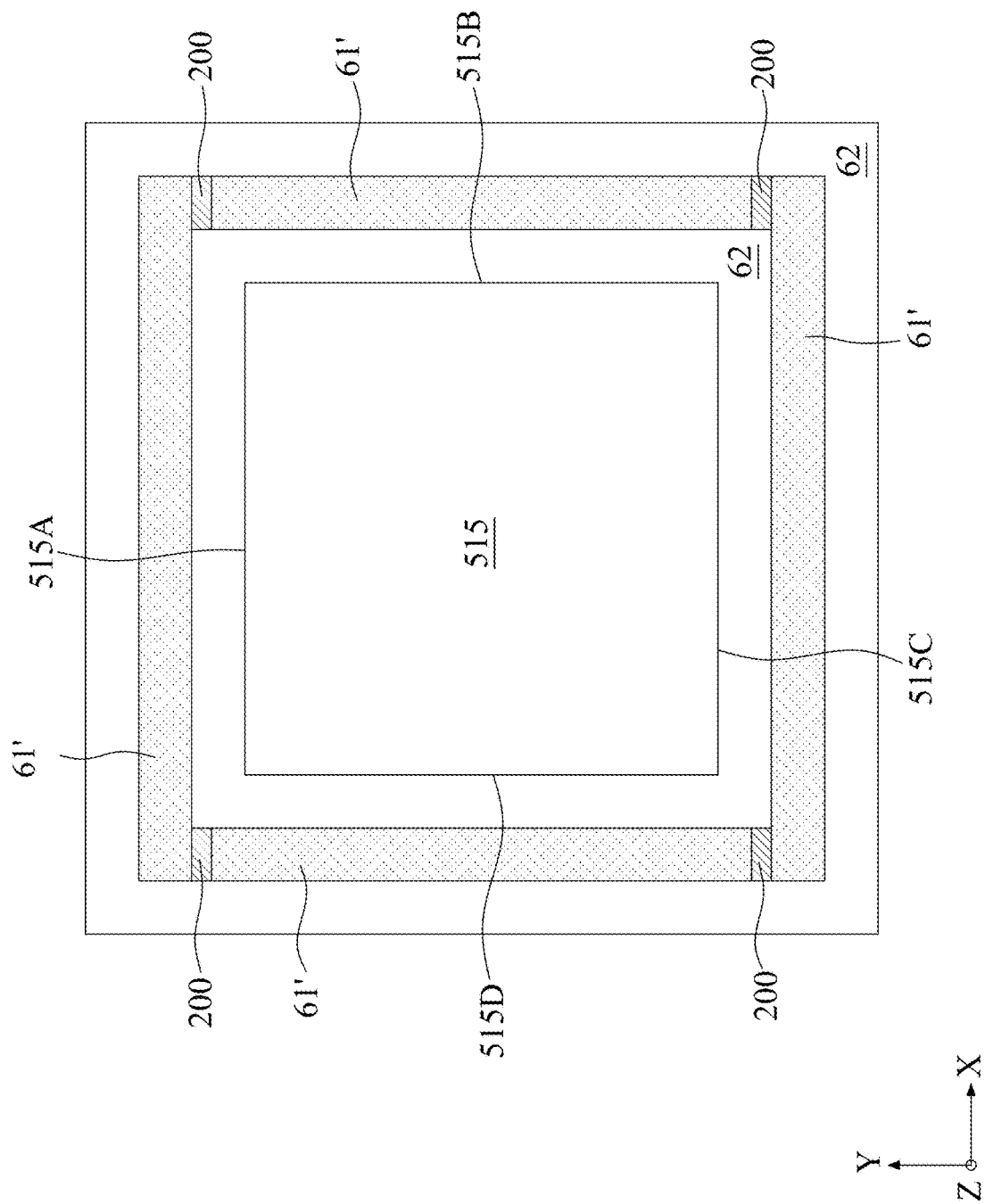
FIG. 13B is a cross-sectional schematic diagram along the line E-E' in FIG. 13A.

FIG. 13A shows a partial schematic diagram of a magnetic tunnel junction of an MRAM according to an eleventh embodiment of the present disclosure. FIG. 13B shows a cross-sectional schematic diagram along the line E-E' in FIG. 13A. In the eleventh embodiment, directions of magnetization of both the magnetic free layer 515 and the magnetic fixed layer 511 are the horizontal direction. The third surface 515A, the fourth surface 515B, the fifth surface 515C and the sixth surface 515D of the magnetic tunnel junction 51 are surrounded by the electromagnetic wave absorption or barrier layer and a non-magnetic insulator layer 62, and the electromagnetic wave absorption or barrier layer may include one of a magnetic ferrite 61' and a conductive layer (including a copper wire 52 or 55). The magnetic ferrite 61' may be separated from at least one of the third surface 515A, the fourth surface 515B, the fifth surface 515C or the sixth surface 515D of the magnetic tunnel junction 51 by the non-magnetic insulator layer 62. In the tenth and eleventh embodiments, by surrounding the outer side of the magnetic tunnel junction 51 with an electromagnetic wave absorption or barrier layer, the magnetic field state of the magnetic tunnel junction can be less susceptible to interference from external signals. The eleventh embodiment is different from the tenth embodiment in that the magnetic ferrite 61' in the electromagnetic wave absorption or barrier layer is not in direct contact with at least one of any side surfaces 515A, 515B, 515C and 515D of the magnetic tunnel junction 51. By additionally providing a non-magnetic insulator layer 62, and separating the four sides of the magnetic ferrite 61' shown in FIG. 13B from each other by using an insulating and non-magnetic material 200 (such as silicon dioxide), when the electromagnetic wave absorption or barrier layer is a magnetic ferrite, the strength of a vertical magnetic field thereof may be set (to be about 1/10 of the magnetic field strength of the magnetic free layer 515) before the manufacturing process of the MRAM, generating magnetic coupling with the magnetic free layer 515 and causing the horizontal magnetic field of the magnetic free layer 515 to deviate from the horizontal line by about 5 degrees, hence reducing the magnitude of the current for writing into the memory to change the stored information. This method can achieve the object of field-free switching currently using a wedge structural design of an MRAM. Moreover, this structure can isolate the magnetic tunnel junction 51 from the exterior to provide dual effects. As shown in FIG. 13A and FIG. 13B, the non-magnetic insulator layer 62 and the magnetic ferrite 61' are first formed by using-semiconductor fabrication process of deposition in a space later to be in direct contact with the fifth surface 515C of the magnetic tunnel junction 51 (note that the magnetic tunnel junction 51 has not been formed at this time), and then the non-magnetic insulator layer 62 and the magnetic ferrite 61' are formed by using a semiconductor fabrication process of deposition in a space later to be in direct contact with the fourth surface 515B and the sixth surface 515D of the magnetic tunnel junction 51 (note that the magnetic tunnel junction 51 has not been formed at this time). Next, the multilayers having the same repetitive structure are deposited in a single semiconductor fabrication process—in the manner described above to simultaneously form a horizontally arranged magnetic tunnel junction 51. Finally, a non-magnetic insulator layer 62 and a magnetic ferrite 61' are formed on the third surface 515A of the magnetic tunnel junction 51 by using a semiconductor fabrication process of deposition (note that the magnetic tunnel junction 51 has been formed at this time). In some embodiments, the non-magnetic insulator layer 62 may include, for example, an oxide or a nitrogen oxide.

Figure 14A:
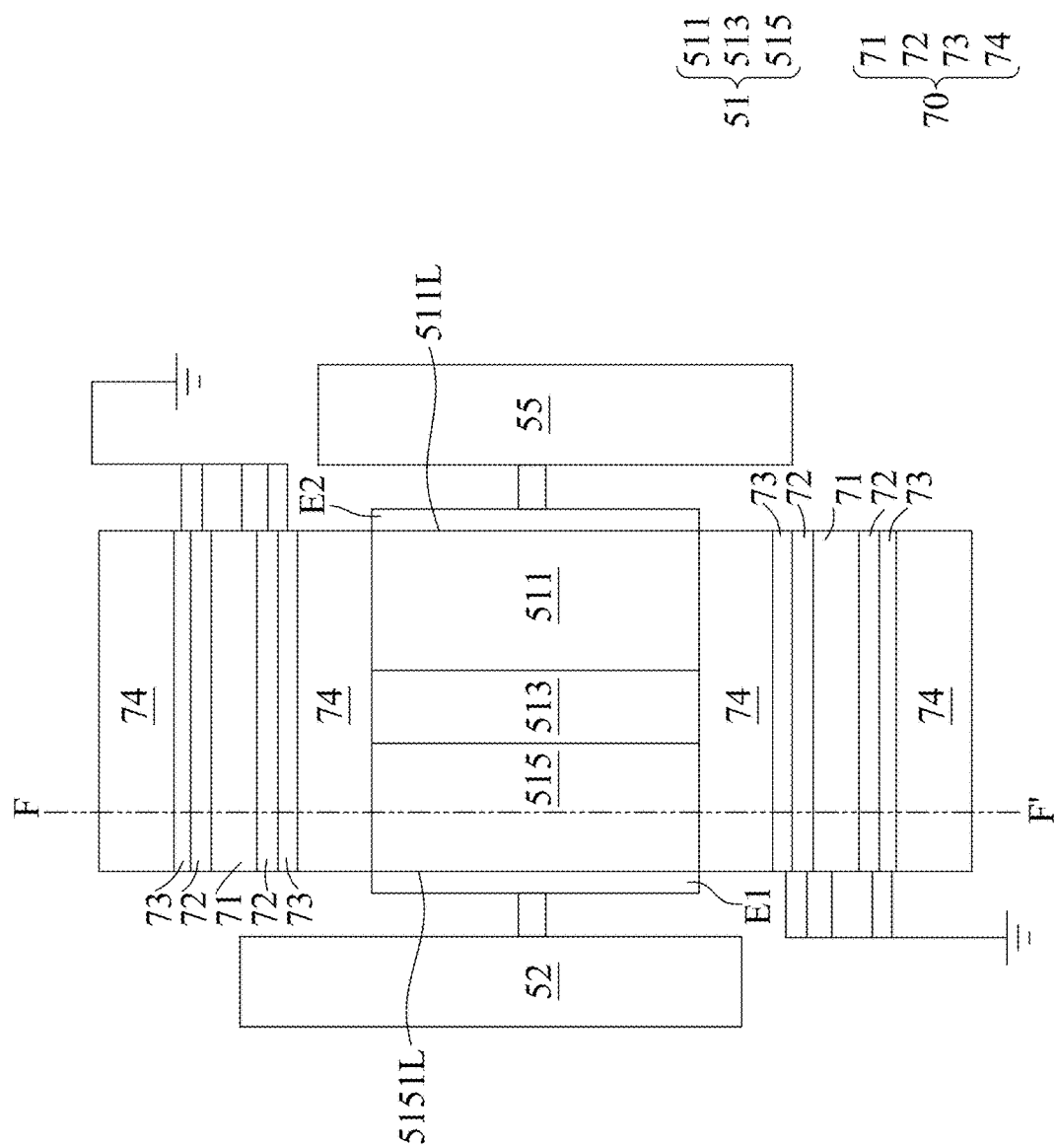
FIG. 14A is a partial schematic diagram of a magnetic tunnel junction in an MRAM according to a twelfth embodiment of the present disclosure.
Figure 14B:
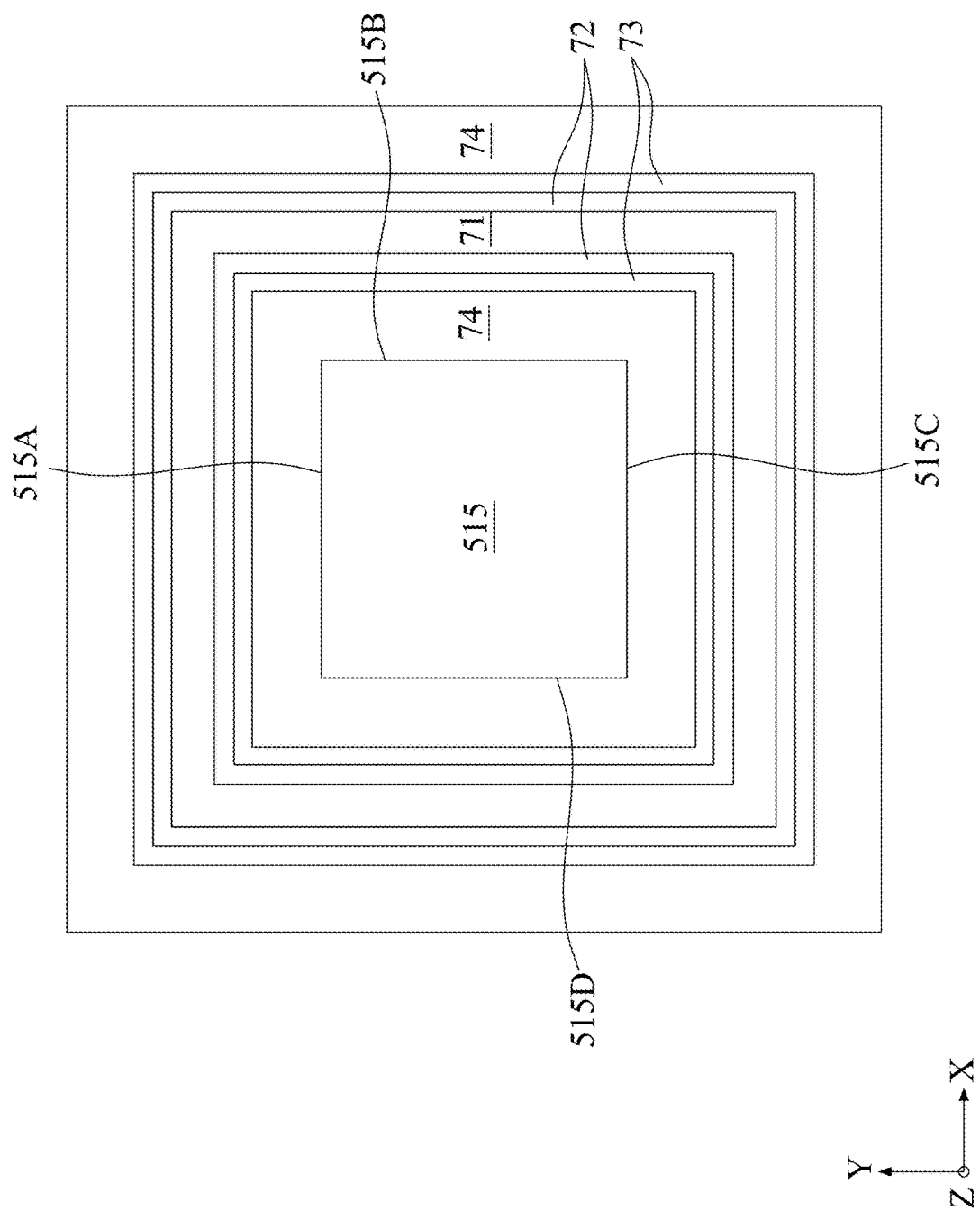
FIG. 14B is a cross-sectional schematic diagram along the line F-F' in FIG. 14A.

FIG. 14A shows a partial schematic diagram of a magnetic tunnel junction 51 of an MRAM according to a twelfth embodiment of the present disclosure. FIG. 14B shows a cross-sectional schematic diagram along the line F-F' in FIG. 14A. In the twelfth embodiment, directions of magnetization of both the magnetic free layer 515 and the magnetic fixed layer 511 are the horizontal direction. The electromagnetic wave absorption or barrier layer disposed outside the magnetic tunnel junction 51 includes a conductive layer (for example, a peripheral structure 70 of a pseudo-coaxial cable). The peripheral structure 70 of the pseudo-coaxial cable is disposed on at least one of the third surface 515A, the fourth surface 515B, the fifth surface 515C or the sixth surface 515D of the magnetic tunnel junction 51 and extends along the side-by-side arrangement direction (X direction) of the magnetic tunnel junction 51. In general, the coaxial cable includes a structure including an inner wire, an inner insulating layer, an outer wire and an outer insulating layer. In this embodiment, the peripheral structure of the pseudo-coaxial cable structure may include a peripheral conductive structure and a peripheral insulating structure. For example, referring to FIG. 14B, the peripheral structure of the pseudo-coaxial cable refers to a structure such as the outer wire and the outer insulating layer described above, and the magnetic tunnel junction 51 located at the center is used in substitution for a conventional inner wire structure. For example, the peripheral structure 70 of the pseudo-coaxial cable may include a copper layer 71, a phosphor-copper alloy layer 72, a barrier layer 73 and an insulator layer 74. The copper layer 71 is adjacent to the phosphor-copper alloy layer 72, or is surrounded on both sides by the phosphor-copper alloy layer 72. The phosphor-copper alloy layer 72 may include copper phosphide ($Cu_3P$), which is adjacent to the copper layer 71 and can function as a seed layer, an adhesion layer and a partial diffusion barrier, and can also prevent the copper layer 71 from being oxidized during the manufacturing process. The barrier layer 73 may selectively, for example, include titanium nitride (TiN). As shown in FIG. 14A, the copper layer 71 and/or the phosphor-copper alloy layer 72 may be grounded, thereby generating electromagnetic shielding effects for the magnetic tunnel junction 51. In some embodiments, for the peripheral structure 70 of the pseudo-coaxial cable, inner and outer insulator layers 74, the barrier layer 73, the phosphor-copper alloy layer 72 and the copper layer 71 may first be formed by using a semiconductor fabrication process of deposition or electroplating in a space later to be in direct contact with the fifth surface 515C of the magnetic tunnel junction 51 (note that the magnetic tunnel junction 51 is not yet formed at this point in time), the peripheral structure 70 of the pseudo-coaxial cable is formed by using a semiconductor fabrication process of deposition in a space later to be in direct contact with the fourth surface 515B and the sixth surface 515D of the magnetic tunnel junction 51 (note that the magnetic tunnel junction 51 is not yet formed at this point in time), then the same repeating structures consisting of multiple layers are formed at the same time by one single deposition step to form the magnetic tunnel junction 51 in a horizontal arrangement by the previous method, and lastly the peripheral structure 70 of the pseudo-coaxial cable is formed by using a semiconductor fabrication process of deposition on the third surface 515A of the magnetic tunnel junction 51 (note that the magnetic tunnel junction 51 has been formed at this point in time).

The tenth to twelfth embodiments above describe examples of disposing the electromagnetic wave absorption or barrier layer outside the magnetic tunnel junction. For upper and lower surfaces of the magnetic tunnel junction, as described above, the copper wires of the bit line 52 and the sensing conductive structure 55 can provide a certain level of shielding effects, that is, the copper wire of the bit line 52 and the copper wire of the sensing conductive structure 55 are respectively located on the first surface 515L and the second surface 511L of the magnetic tunnel junction 51, and are configured to shield the magnetic tunnel junction 51 and transmit signals to the magnetic tunnel junction 51 for write and read operations thereof.

The features of some embodiments of the present disclosure are described in brief for a person skilled in the art to more comprehensively understand various aspects of the present disclosure. A person of ordinary skill in the art of the present disclosure would be able to understand and easily practice the details of the present disclosure as the basis to design or modify other operations and structures, so as to implement the same objects and/or achieve the same advantages as those of the embodiments described herein. A person of ordinary skill in the art of the present disclosure would be able to understand that, these equivalent implementation forms are encompassed within the spirit and scope of the present disclosure, and various alterations, replacements, substitutions and modifications may be made to the embodiments without departing the spirit or scope of the present disclosure.

Moreover, the scope of the details of present disclosure is not intended to be limited to specific embodiments of the processes, machines, manufactured products, substance compositions, means, methods or steps described in the detailed description. A person skilled in the art of the present disclosure could easily conceive from the present disclosure that, according to the details of the present disclosure, existing or future developed processes, machines, manufactured products, substance compositions, means, methods or steps that achieve the same functions or achieve substantially the same results corresponding to those of the embodiments described in the present disclosure can be utilized. Accordingly, such processes, machines, manufactured products, substance compositions, means, methods and steps are encompassed within the scope of the appended claims.

What is claimed is:

1. A magnetoresistive random access memory (MRAM), comprising:
    a magnetic tunnel junction, comprising:
        a magnetic fixed layer;
        a tunnel barrier layer, stacked with the magnetic fixed layer;
        a magnetic free layer, stacked with the tunnel barrier layer; and
        at least one magnetic enhancement layer, disposed corresponding to at least one of the magnetic free layer or the magnetic fixed layer, wherein the at least one magnetic enhancement layer comprises a plurality of magnetic columnar structures, and the magnetic columnar structures have a primary extension direction substantially identical with a stacking direction of the magnetic tunnel junction; and
    a transistor structure, electrically connected to the magnetic tunnel junction.

2. The magnetoresistive random access memory according to claim 1, wherein the at least one magnetic enhancement layer defines a distinguishable partial region within the at least one of the magnetic free layer or the magnetic fixed layer.

3. The magnetoresistive random access memory according to claim 1, wherein the at least one magnetic enhancement layer and the magnetic fixed layer together form a first composite layer, and/or the at least one magnetic enhancement layer and the magnetic free layer together form a second composite layer.

4. The magnetoresistive random access memory according to claim 1, wherein an upper surface, a lower surface or at least one of any side surfaces of the magnetic tunnel junction is surrounded by one or more electromagnetic wave absorption or barrier layers.

5. The magnetoresistive random access memory according to claim 4, wherein the one or more electromagnetic wave absorption or barrier layers comprise at least one of a magnetic ferrite, a non-magnetic ferrite or a conductive layer.

6. The magnetoresistive random access memory according to claim 5, wherein the non-magnetic ferrite is in direct contact with at least one of any side surfaces of the magnetic tunnel junction, and the magnetic ferrite is separated from at least one of any side surfaces of the magnetic tunnel junction by an insulator layer.

7. The magnetoresistive random access memory according to claim 5, wherein the conductive layer is a peripheral structure of a pseudo-coaxial cable formed by a phosphor-copper alloy layer, and the peripheral structure of the pseudo-coaxial cable is disposed on at least one of any side surfaces of the magnetic tunnel junction and extends along a stacking direction of the magnetic tunnel junction.

8. The magnetoresistive random access memory according to claim 7, wherein the peripheral structure of the pseudo-coaxial cable further comprises a copper layer adjacent to the phosphor-copper alloy layer.

9. The magnetoresistive random access memory according to claim 5, wherein the conductive layer further comprises a copper wire, and the copper wire is located on an upper surface and a lower surface of the magnetic tunnel junction and is configured to shield the magnetic tunnel junction and transmit signals of the magnetic tunnel junction.

10. A magnetoresistive random access memory (MRAM), comprising:
    a magnetic tunnel junction, comprising:
        a magnetic fixed layer;
        a tunnel barrier layer, arranged side-by-side with the magnetic fixed layer; and
        a magnetic free layer, arranged side-by-side with the tunnel barrier layer;
        at least one magnetic enhancement layer, disposed corresponding to at least one of the magnetic free layer or the magnetic fixed layer; and
        a transistor structure, electrically connected to the magnetic tunnel junction,
        wherein bottom surfaces of the magnetic free layer, the tunnel barrier layer and the magnetic fixed layer form a coplanar surface.

11. The magnetoresistive random access memory according to claim 10, wherein the magnetic fixed layer comprises a ferromagnetic material layer and a non-ferromagnetic material layer arranged side-by-side.

12. The magnetoresistive random access memory according to claim 10, wherein the at least one magnetic enhancement layer and the magnetic fixed layer together form a first composite layer, and/or the at least one magnetic enhancement layer and the magnetic free layer together form a second composite layer.

13. The magnetoresistive random access memory according to claim 10, wherein the at least one magnetic enhancement layer comprises a plurality of magnetic columnar structures, and the magnetic columnar structures have a primary extension direction substantially identical with a side-by-side arrangement direction of the magnetic tunnel junction.

14. The magnetoresistive random access memory according to claim 10, wherein the magnetic tunnel junction has a first surface or a second surface parallel to a side-by-side arrangement direction surrounded by the one or more electromagnetic wave absorption or barrier layers, or has at least one of a third surface, a fourth surface, a fifth surface or a sixth surface perpendicular to the side-by-side arrangement direction surrounded by the one or more electromagnetic wave absorption or barrier layers.

15. The magnetoresistive random access memory according to claim 14, wherein the one or more electromagnetic wave absorption or barrier layers comprise at least one of a magnetic ferrite, a non-magnetic ferrite and a conductive layer.

16. The magnetoresistive random access memory according to claim 15, wherein the non-magnetic ferrite is in direct contact with at least one of the third surface, the fourth surface, the fifth surface or the sixth surface of the magnetic tunnel junction, and the magnetic ferrite is separated from at least one of the third surface, the fourth surface, the fifth surface or the sixth surface of the magnetic tunnel junction by an insulator layer.

17. The magnetoresistive random access memory according to claim 15, wherein the conductive layer is a peripheral structure of a pseudo-coaxial cable formed by a phosphor-copper alloy layer, and the peripheral structure of the pseudo-coaxial cable is disposed on at least one of the third surface, the fourth surface, the fifth surface or the sixth surface of the magnetic tunnel junction and extends along the side-by-side arrangement direction of the magnetic tunnel junction.

18. The magnetoresistive random access memory according to claim 17, wherein the peripheral structure of the pseudo-coaxial cable further comprises a copper layer adjacent to the phosphor-copper alloy layer.

19. The magnetoresistive random access memory according to claim 1, wherein the plurality of magnetic columnar structures comprises Fe, Co, Ni and/or Ru.

20. A magnetoresistive random access memory (MRAM), comprising:
    a magnetic tunnel junction, comprising:
        a magnetic fixed layer;
        a tunnel barrier layer, arranged side-by-side with the magnetic fixed layer; and
        a magnetic free layer, arranged side-by-side with the tunnel barrier layer; and
    a transistor structure, electrically connected to the magnetic tunnel junction,
    wherein bottom surfaces of the magnetic free layer, the tunnel barrier layer and the magnetic fixed layer form a coplanar surface, and wherein the magnetic fixed layer comprises a ferromagnetic material layer and a non-ferromagnetic material layer arranged side-by-side.

* * * * *